(12) United States Patent
Shiomi et al.

(10) Patent No.: US 10,733,299 B2
(45) Date of Patent: Aug. 4, 2020

(54) SYSTEM AND METHOD FOR UPDATING A PLURALITY OF INFORMATION PROCESSING APPARATUSES IN A LOCAL NETWORK USING RECEIVED UPDATE PROGRAM

(71) Applicant: NINTENDO CO., LTD., Kyoto (JP)

(72) Inventors: Hiroki Shiomi, Kyoto (JP); Hitoshi Sakai, Kyoto (JP); Hiromasa Shimada, Kyoto (JP); Takumi Kanaya, Kyoto (JP); Tsuyoshi Iwaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/911,528

(22) Filed: Mar. 5, 2018

(65) Prior Publication Data

US 2019/0108345 A1    Apr. 11, 2019

(30) Foreign Application Priority Data

Oct. 6, 2017    (JP) ................. 2017-196287

(51) Int. Cl.
*G06F 8/60*        (2018.01)
*H04W 4/06*        (2009.01)
(Continued)

(52) U.S. Cl.
CPC ............. *G06F 21/57* (2013.01); *G06F 8/60* (2013.01); *G06F 8/65* (2013.01); *H04W 4/06* (2013.01)

(58) Field of Classification Search
None
See application file for complete search history.

(56) References Cited

U.S. PATENT DOCUMENTS 8,832,681 B1 *  9/2014  Cantrell ............. G06F 8/61
                                                        717/172
9,158,526 B1 * 10/2015  Nguyen ............. H04L 41/08
(Continued)

FOREIGN PATENT DOCUMENTS

JP    2012-018657    1/2012
JP    2012-145985    8/2012
(Continued)

OTHER PUBLICATIONS

"8 Ways to find the exact version of any Windows application", Internet article, Rusen, published on Apr. 4, 2016 (Year: 2016).*
(Continued)

*Primary Examiner* — Daxin Wu
(74) *Attorney, Agent, or Firm* — Nixon & Vanderhye PC

(57) ABSTRACT

Based on version information owned by each of information processing apparatuses, an information processing apparatus that stores the newest version of a user application among the plurality of information processing apparatuses is specified, and an update program for updating the user application to the newest version of the user application is directly transmitted through wireless communication from the information processing apparatus that stores the newest version of the user application to an information processing apparatus that does not store the newest version of the user application among the plurality of information processing apparatuses, thereby updating the user application of an information processing apparatus performing this method among the plurality of information processing apparatuses, using the received update program.

25 Claims, 8 Drawing Sheets

(51) Int. Cl.
G06F 21/57 (2013.01)
G06F 8/65 (2018.01)

(56) References Cited

U.S. PATENT DOCUMENTS

| | | |
|---|---|---|
| 9,389,846 B2* | 7/2016 | Hatamoto .................. G06F 8/65 |
| 9,420,065 B2* | 8/2016 | Mayo .................. H04L 67/1091 |
| 2006/0015850 A1* | 1/2006 | Poole ........................ G06F 8/71 |
| | | 717/120 |
| 2011/0307884 A1 | 12/2011 | Wabe et al. |
| 2012/0180034 A1 | 7/2012 | Hatamoto et al. |
| 2013/0104117 A1* | 4/2013 | Vedantham ............. G06F 8/654 |
| | | 717/172 |
| 2015/0026675 A1* | 1/2015 | Csaszar ..................... G06F 8/61 |
| | | 717/178 |
| 2015/0331688 A1* | 11/2015 | Shimizu .................. G06F 8/654 |
| | | 717/170 |
| 2016/0092198 A1* | 3/2016 | Vangeel .................. G06F 8/654 |
| | | 717/173 |
| 2016/0299754 A1 | 10/2016 | Wei |

FOREIGN PATENT DOCUMENTS

| | | |
|---|---|---|
| JP | WO2014/097436 | 6/2014 |
| JP | 2017-502396 | 1/2017 |

OTHER PUBLICATIONS

Internet article "Beware of Conditional Limitations when Drafting Patent Claims", By Vladimir Lozan, Aug. 28, 2017 (Year: 2017).*

* cited by examiner

SYSTEM AND METHOD FOR UPDATING A PLURALITY OF INFORMATION PROCESSING APPARATUSES IN A LOCAL NETWORK USING RECEIVED UPDATE PROGRAM

CROSS REFERENCE TO RELATED APPLICATION

The disclosure of Japanese Patent Application No. 2017-196287, filed on Oct. 6, 2017, is incorporated herein by reference.

FIELD

The technology shown here relates to an information processing system and an information processing method, and in particular, relates to an information processing system and an information processing method in which, for example, a plurality of information processing apparatuses communicate with each other.

BACKGROUND AND SUMMARY

Conventionally, there is an information processing system for connecting to a server and updating an application and a system, using communication on the Internet.

In the information processing system, when, using local communication between a plurality of information processing apparatuses placed in a local network, each of the information processing apparatuses executes an application, the versions of the application of the respective apparatuses may need to be the same as each other. However, when the plurality of information processing apparatuses cannot update the application to the same version using communication on the Internet, the application cannot be executed using the local communication between the plurality of information processing apparatuses.

Therefore, it is an object of an exemplary embodiment to provide an information processing system and an information processing method for, even in a situation where an application cannot be updated using communication on the Internet, enabling the execution of the application by making the versions of the application the same among a plurality of information processing apparatuses.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to the exemplary embodiment, an information processing system includes a plurality of information processing apparatuses, each storing a user application and version information of the user application. At least one of the plurality of information processing apparatuses stores an update program for the user application. The information processing system includes computers each configured to: based on the version information owned by each of the information processing apparatuses, specify an information processing apparatus that stores the newest version of the user application among the plurality of information processing apparatuses; directly transmit an update program for updating the user application to the newest version of the user application, through wireless communication from the information processing apparatus that stores the newest version of the user application to an information processing apparatus that does not store the newest version of the user application among the plurality of information processing apparatuses; directly receive the transmitted update program through the wireless communication; and update the user application of an information processing apparatus having the computer among the plurality of information processing apparatuses, using the received update program.

Based on the above, even in a situation where an application cannot be updated using communication on the Internet, a user application can be executed by making the versions of the user application the same among a plurality of information processing apparatuses. Further, using so-called local communication in which a plurality of information processing apparatuses placed in a local network area directly wirelessly communicate with each other, the user application can be executed by making the versions of the user application the same among the plurality of information processing apparatuses.

Further, each of the computers of the plurality of information processing apparatuses may be further configured to set the information processing apparatus having the computer as either of a child apparatus and a parent apparatus having the computer configured to perform the specifying. The computer of the child apparatus may be further configured to transmit the version information of the user application stored in the information processing apparatus having the computer to the parent apparatus. The computer of the parent apparatus may be further configured to receive the version information transmitted from the child apparatus. In the specifying, based on the version information received from the child apparatus and the version information of the user application of the information processing apparatus having the computer, the information processing apparatus that stores the newest version of the user application may be specified.

Based on the above, an information processing apparatus set as a parent apparatus among the plurality of information processing apparatuses can manage the versions of the user application stored in the respective information processing apparatuses.

Further, when the information processing apparatus that stores the newest version of the user application is the parent apparatus, the computer of the parent apparatus may directly transmit through the wireless communication the update program for updating the user application to the newest version of the user application to the child apparatus that does not store the newest version of the user application, thereby performing the transmission of the update program. The computer of the child apparatus may directly receive the update program transmitted from the parent apparatus through the wireless communication, thereby performing the reception of the update program, and using the update program received from the parent apparatus, may update the user application of the information processing apparatus having the computer, thereby performing the update.

Based on the above, when the information processing apparatus set as the parent apparatus stores the newest version of the user application, the parent apparatus directly transmits an update program to a child apparatus through wireless communication, it is possible to make the versions of the user application stored in the plurality of information processing apparatuses the same as each other.

Further, when another child apparatus that does not store the newest version of the user application is further included in the information processing system, in the transmission of the update program, the update program may be further configured to be directly transmitted to the other child apparatus through the wireless communication. The computer of the other child apparatus may directly receive the update program transmitted from the parent apparatus through the wireless communication, thereby performing the reception of the update program, and may update the user application of the information processing apparatus having the computer using the update program received from the parent apparatus, thereby performing the update.

Based on the above, when the information processing apparatus as the parent apparatus stores the newest version of the user application, the parent apparatus also directly transmits the update program to another child apparatus through the wireless communication, whereby it is possible to make the versions of the user application stored in the parent apparatus and the plurality of child apparatuses the same as each other.

Further, when the information processing apparatus that stores the newest version of the user application is the child apparatus, the computer of the parent apparatus may be further configured to request the update program for updating the user application to the newest version of the user application, from the child apparatus that stores the newest version of the user application. When the update program is requested by the parent apparatus, the computer of the child apparatus may directly transmit the update program to the parent apparatus through the wireless communication, thereby performing the transmission of the update program. The computer of the parent apparatus may directly receive the update program transmitted from the child apparatus through the wireless communication, thereby performing the reception of the update program, and may update the user application of the information processing apparatus having the computer using the update program received from the child apparatus, thereby performing the update.

Based on the above, when an information processing apparatus as a child apparatus stores the newest version of the user application, the child apparatus directly transmits an update program to the parent apparatus through wireless communication, whereby it is possible to make the versions of the user application stored in the plurality of information processing apparatuses the same as each other.

Further, when another child apparatus that does not store the newest version of the user application is further included in the information processing system, the computer of the parent apparatus may be further configured to directly transfer through the wireless communication the update program transmitted from the child apparatus to the other child apparatus. The computer of the other child apparatus may directly receive the update program transferred from the parent apparatus through the wireless communication, thereby performing the reception of the update program, and may update the user application of the information processing apparatus having the computer using the update program received from the parent apparatus, thereby performing the update.

Based on the above, when an information processing apparatus as a child apparatus stores the newest version of the user application, the parent apparatus directly transfers the update program to another child apparatus through the wireless communication, whereby it is possible to make the versions of the user application stored in the plurality of information processing apparatuses the same as each other.

Further, each of the plurality of information processing apparatuses may store, in addition to the user application, a basic application for at least controlling execution of the user application, and basic version information of the basic application. In this case, at least one of the plurality of information processing apparatuses may store a basic update program for the basic application. In the specifying, based on the basic version information owned by each of the information processing apparatuses, an information processing apparatus that stores the newest version of the basic application among the plurality of information processing apparatuses may be further specified. In the transmission of the update program, the basic update program for updating the basic application to the newest version of the basic application may be further configured to be directly transmitted through the wireless communication from the information processing apparatus that stores the newest version of the basic application to an information processing apparatus that does not store the newest version of the basic application among the plurality of information processing apparatuses. In the reception of the update program, the transmitted basic update program may be further configured to be directly received through the wireless communication. In the update, the basic application of the information processing apparatus having the computer may be further configured to be updated using the received basic update program.

Based on the above, by further making the versions of a basic application of the plurality of information processing apparatuses the same as each other, the basic application and the user application can be executed.

Further, in the update, when the basic application of the information processing apparatus having the computer is to be updated, and after the basic application of the information processing apparatus having the computer is updated using the received basic update program, the user application of the information processing apparatus having the computer may be updated using the received update program.

Based on the above, it is possible to prevent a failure due to the fact that the version of the basic application is different from the version of the user application.

Further, in the transmission of the update program, only when the basic application needs to be updated to the newest version to execute the newest version of the user application, the basic update program for updating the basic application to the newest version of the basic application may be transmitted to the information processing apparatus that does not store the newest version of the basic application.

Based on the above, the basic application is minimally updated to execute the user application. Thus, it is possible to reduce an update process and shorten the time until the user application becomes able to be executed.

Further, each of the computers of the plurality of information processing apparatuses may set the information processing apparatus having the computer as either of a child apparatus and a parent apparatus including a computer configured to perform the specifying. The computer of the child apparatus may be further configured to collectively transmit to the parent apparatus the version information of the user application stored in the information processing apparatus having the computer and the basic version information of the basic application stored in the information processing apparatus having the computer. The computer of the parent apparatus may be further configured to receive the version information and the basic version information transmitted from the child apparatus. In the specifying, based on the version information received from the child apparatus and the version information of the user application of the information processing apparatus having the computer, the information processing apparatus that stores the newest version of the user application may be specified, and based on the basic version information received from the child apparatus and the basic version information of the basic application of the information processing apparatus having the computer, the information processing apparatus that stores the newest version of the basic application may be specified.

Based on the above, version information of the basic application and the user application is collectively transmitted and received. Thus, it is possible to reduce the load of a data transmission/reception process and the load of a version management process.

Further, each of the computers of the plurality of information processing apparatuses may execute the user application, thereby transmitting and receiving data to and from the other information processing apparatuses, and based on the transmitted and received data, performs information processing.

Based on the above, the plurality of information processing apparatuses execute the user application of which the versions are made the same, whereby it is possible to achieve information processing in which the information processing apparatuses transmit and receive data to and from each other.

Further, in the setting, when the information processing apparatus that stores the newest version of the basic application is the child apparatus, the child apparatus may be changed to a parent apparatus, and another one of the information processing apparatuses may be changed to a child apparatus.

Based on the above, the settings of parent and child apparatuses are changed, whereby it is possible to control communication such that the information processing apparatus that stores the newest version of the basic application is a parent apparatus.

Further, the exemplary embodiment may be carried out in the forms of an information processing apparatus, a non-transitory computer-readable storage medium having stored therein an information processing program, and an information processing method.

According to the exemplary embodiment, even in a situation where an application cannot be updated using communication on the Internet, the application can be executed by making the versions of the application the same among a plurality of information processing apparatuses.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
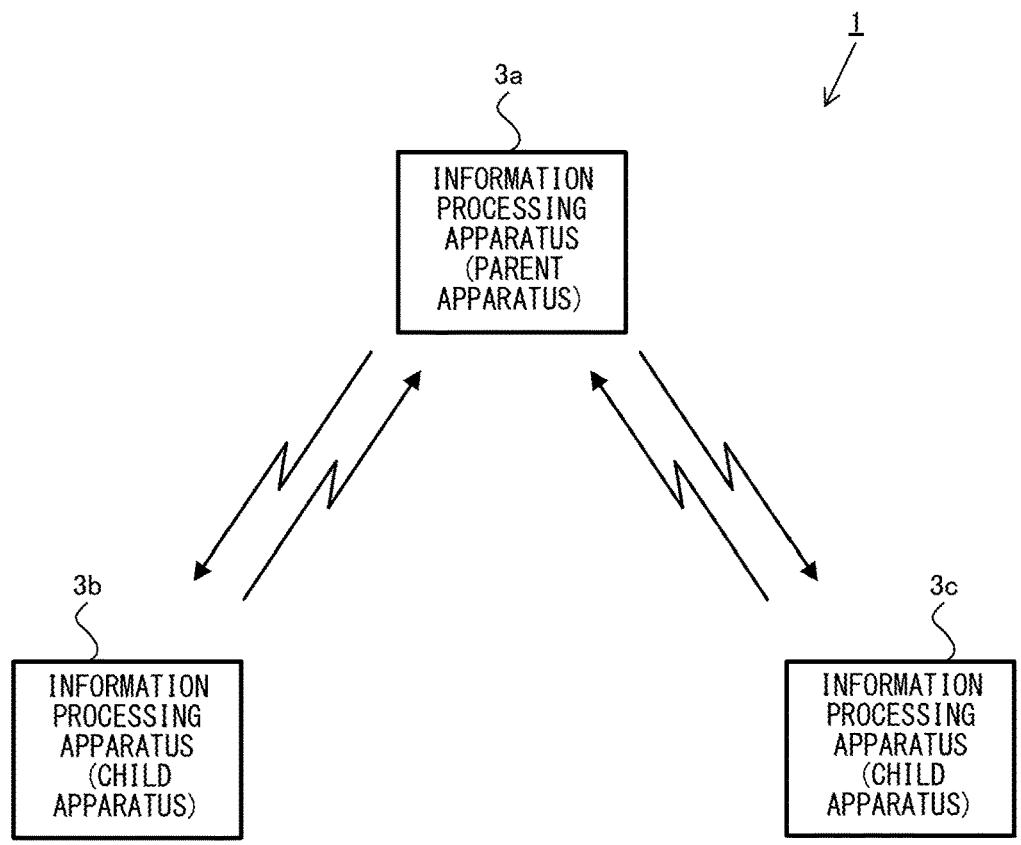
FIG. 1 is a diagram showing a non-limiting example of an information processing system 1 according to an exemplary embodiment.

With reference to FIG. 1, an information processing system according to an exemplary embodiment is described. As shown in FIG. 1, an information processing system 1, which is an example of the information processing system, is constructed by a plurality of information processing apparatuses 3 (three information processing apparatuses 3a, 3b, and 3c in FIG. 1), which are wirelessly connected together through local communication. Each of the information processing apparatuses 3 can perform so-called "local communication" in which the information processing apparatus 3 can wirelessly communicate with the other information processing apparatuses 3 placed in a closed local network area, and the plurality of information processing apparatuses 3 directly communicate with each other to transmit and receive data. Here, the "local communication" that each information processing apparatus 3 can perform with the other information processing apparatuses 3 is communication using an infrastructure mode where the information processing apparatuses 3 are directly wirelessly connected together not via the Internet. As an example, in the exemplary embodiment, the local communication is performed using an infrastructure mode where any of the information processing apparatuses 3 serves as a parent apparatus (the information processing apparatus 3a in the example of FIG. 1) to govern a network, and the other information processing apparatuses 3 serve as child apparatuses (the information processing apparatuses 3b and 3c in the example of FIG. 1) for communicating with each other via the parent apparatus. It should be noted that the local communication may be performed using an ad hoc mode where the information processing apparatuses 3 are directly wirelessly connected together not via a parent apparatus (an access point). In the use form described below, an example is used where based on information transmitted and received through the local communication using the infrastructure mode, the plurality of information processing apparatuses 3 perform information processing (e.g., a communication game).

Each of the information processing apparatuses 3 is configured to connect to the other information processing apparatuses 3 using the local communication. Then, the information processing apparatus 3 establishes connections with the other information processing apparatuses 3 through the local communication and thereby can communicate with the other information processing apparatuses 3. For example, the information processing apparatus 3 can execute a program stored in a storage medium such as an exchangeable memory card or an exchangeable optical disk, or received from a server or another apparatus. The information processing apparatus 3 may be a mobile game apparatus, or may be a device such as a general personal computer, a stationary game apparatus, a mobile phone, or a PDA (Personal Digital Assistant).

Figure 2:
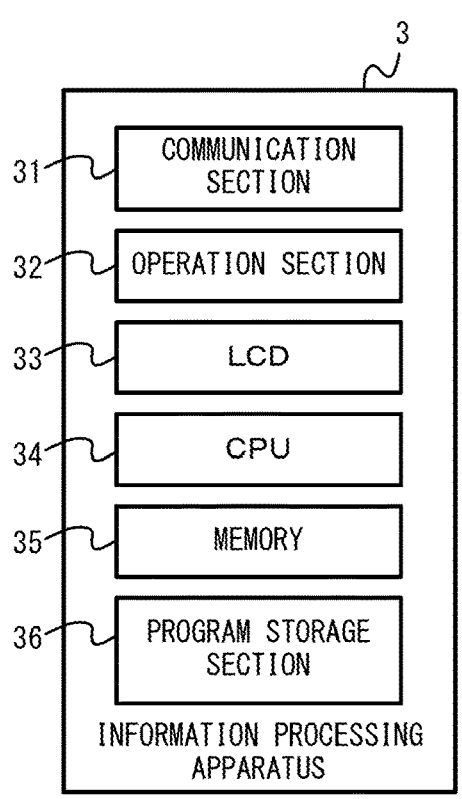
FIG. 2 is a block diagram showing a non-limiting example of the configuration of an information processing apparatus 3.

Next, with reference to FIG. 2, the information processing apparatus 3 is described. It should be noted that FIG. 2 is a block diagram showing an example of the configuration of the information processing apparatus 3.

The information processing apparatus 3 includes a communication section 31, an operation section 32, an LCD 33, a CPU 34, a memory 35, and a program storage section 36. It should be noted that the information processing apparatus 3 may be composed of one or more apparatuses including an apparatus having at least the CPU 34, and another apparatus.

The communication section 31 has the function of wirelessly communicating with another communication device and the like. In the exemplary embodiment, the communication section 31 is connected to the CPU 34. The communication section 31 performs communication (specifically, through wireless communication) with an external apparatus via a network. In the exemplary embodiment, as a first communication form, the communication section 31 connects to a wireless LAN using a method compliant with the Wi-Fi standard (e.g., the IEEE 802.11b/g/n/ac/ad standard) and communicates with an external apparatus via a network such as the Internet. Further, as a second communication form, the communication section 31 wirelessly communicates with the other information processing apparatuses 3 of the same type, using a predetermined communication method (e.g., communication based on a unique protocol or infrared light communication). It should be noted that the wireless communication in the second communication form achieves the function of enabling so-called "local communication" in which the information processing apparatus 3 can wirelessly communicate with the other information processing apparatuses 3 placed in a closed local network area, and the plurality of information processing apparatuses 3 directly communicate with each other to transmit and receive data.

The CPU 34 is an example of information processing means (a computer) for executing various types of information processing. The CPU 34 has the function of, as the various types of information processing, receiving data from the other information processing apparatuses 3 via the communication section 31 and executing processing based on the received data, and the like. Further, the CPU 34 has the function of, as the various types of information processing, executing the process of creating transmission data to be transmitted to the other information processing apparatuses 3 and transmitting the transmission data via the communication section 31, and the like. For example, the above functions are achieved by the CPU 34 executing a predetermined program. As an example, the CPU 34 transmits and receives data to and from the other information processing apparatuses 3 through the local communication, thereby performing a communication game in a predetermined virtual space.

The memory 35 stores various types of data for use when the CPU 34 performs the above information processing. The memory 35 is, for example, a memory accessible by the CPU 34.

The program storage section 36 stores a program. The program storage section 36 may be any storage device (storage medium) accessible by the CPU 34. For example, the program storage section 36 may be a storage device provided in the information processing apparatus 3 including the CPU 34, or may be a storage medium detachably attached to the information processing apparatus 3 including the CPU 34. Alternatively, the program storage section 36 may be a storage device (a server or the like) connected to the CPU 34 via a network. The CPU 34 may load a part or all of the program into the memory 35 at an appropriate timing and execute the loaded program.

The operation section 32 is an input apparatus that can be operated by the user. The operation section 32 may be any input apparatus. For example, the operation section 32 may include an operation button, a stick, a touch panel, and an orientation sensor such as a gyro sensor.

The LCD 33 is an example of a display section included in the information processing apparatus 3 and displays an image in accordance with an instruction from the CPU 34.

In the exemplary embodiment, in a case where the communication game is performed using the plurality of information processing apparatuses 3, the information processing apparatuses 3 placed in a closed local network area locally communicate with each other, whereby the communication game progresses. Then, different users operate the respective information processing apparatuses 3. For example, in accordance with the fact that the same version of a game application is executed by each of the three information processing apparatuses 3a to 3c, the communication game progresses in each of the information processing apparatuses 3a to 3c. It should be noted that the game application corresponds to an example of a user application according to the exemplary embodiment.

As an example, based on operation data obtained by a first user operating the operation section 32 of the information processing apparatus 3a, the information processing apparatus 3a controls a first virtual object placed in the virtual space in the communication game. Then, the information processing apparatus 3a transmits information based on an operation using the operation section 32 of the information processing apparatus 3a to each of the other information processing apparatuses 3a and 3c through the local communication. Here, the information based on an operation may be operation information indicating an operation on the operation section 32, or may be information regarding the virtual object or the virtual space on which an operation on the operation section 32 is reflected. The operation information may include at least any one of, for example, key data indicating an operation on each button, stick data indicating the tilt state of the stick, sensor data indicating the detection states of sensors such as an acceleration sensor and an angular velocity sensor, and the like, or may be data indicating the results of making predetermined calculations on the above data. The information regarding the virtual object or the virtual space may be, for example, object data indicating the position, the direction, the action, the state, and the like of the virtual object in the virtual space, or the like.

Further, based on operation data obtained by a second user operating the operation section 32 of the information processing apparatus 3b, the information processing apparatus 3b controls a second virtual object placed in the virtual space in the communication game. Then, the information processing apparatus 3*b* transmits information based on an operation using the operation section 32 of the information processing apparatus 3*b* to each of the other information processing apparatuses 3*a* and 3*c* through the local communication. Further, based on operation data obtained by a third user operating the operation section 32 of the information processing apparatus 3*c*, the information processing apparatus 3*c* controls a third virtual object placed in the virtual space in the communication game. Then, the information processing apparatus 3*c* transmits information based on an operation using the operation section 32 of the information processing apparatus 3*c* to each of the other information processing apparatuses 3*a* and 3*b* through the local communication.

In the exemplary embodiment, in a case where the versions of the game application need to be the same among the information processing apparatuses 3 to achieve such a communication game using the plurality of information processing apparatuses 3, then before the communication game is started, it is determined whether or not the above versions are the same among the information processing apparatuses 3. Then, when the above versions are different from each other, the plurality of information processing apparatuses 3 transmit and receive a game update program to and from each other through the local communication to make the above versions the same as the newest version among the versions of the game application owned by the information processing apparatuses 3. It should be noted that, typically, the game update program itself is acquired in advance by being downloaded from a server or the like through communication on the Internet. Further, the game application and the game update program owned by (stored in) each of the information processing apparatuses 3 are already installed in the information processing apparatus 3. Here, to control the confirmation of the versions of the game application and the transmission and reception of the game update program, the plurality of information processing apparatuses 3 are set as a parent apparatus or child apparatuses, and the information processing apparatus 3 as the parent apparatus controls the above versions. It should be noted that the above game data (information based on an operation) to be transmitted and received after communication game is started may also be transmitted and received via the parent apparatus.

Figure 3:
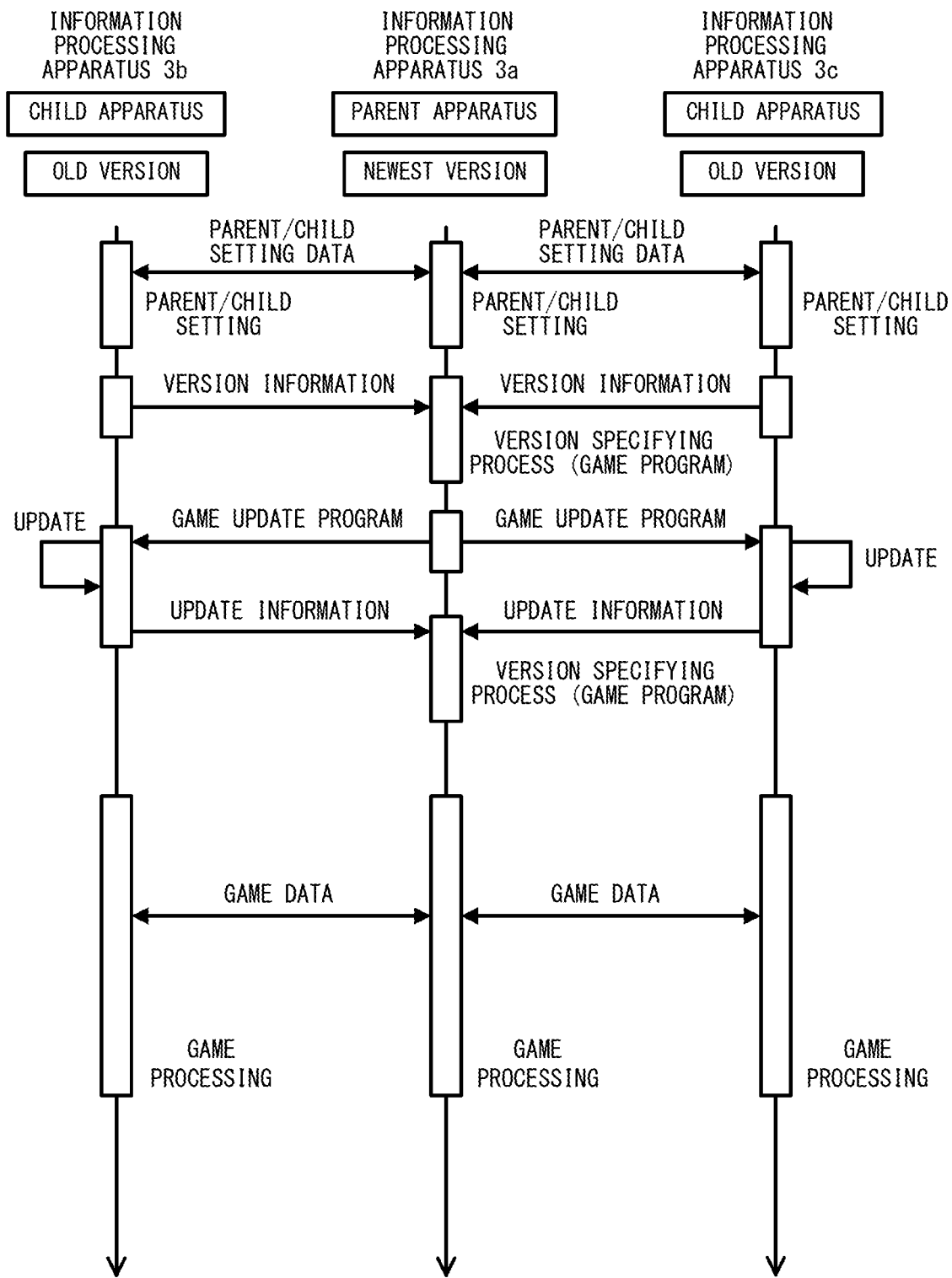
FIG. 3 is a communication timing chart showing a non-limiting example of a process in a case where an information processing apparatus 3a set as a parent apparatus owns the newest version of a game application.
Figure 4:
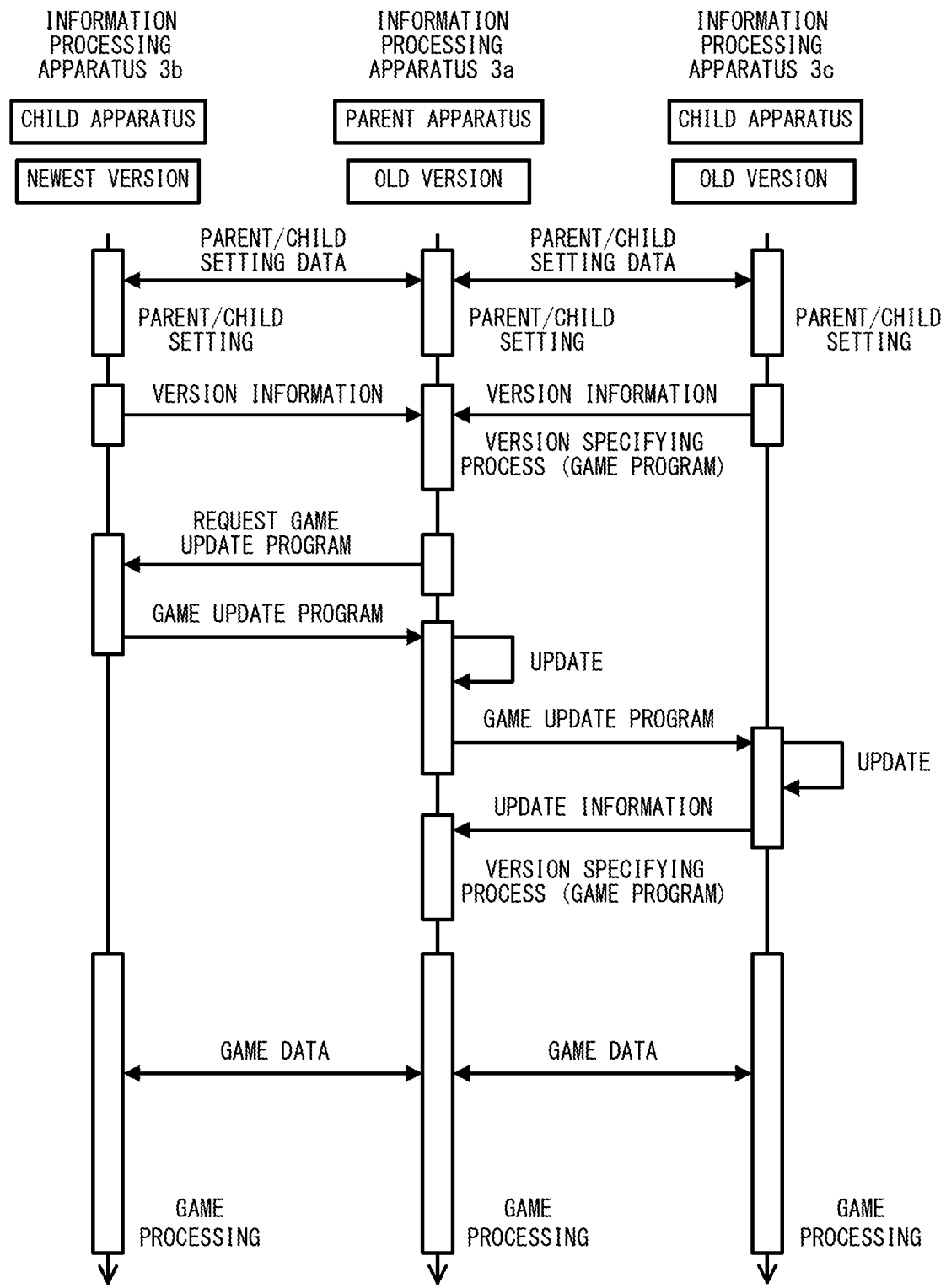
FIG. 4 is a communication timing chart showing a non-limiting example of the process in a case where an information processing apparatus 3b set as a child apparatus owns the newest version of the game application.

With reference to FIGS. 3 and 4, a description is given of examples of the process of specifying the versions owned by the plurality of information processing apparatuses 3 and making the specified versions the same as the newest version among the plurality of information processing apparatuses 3. It should be noted that FIG. 3 is a communication timing chart showing an example of the process in a case where the information processing apparatus 3*a* set as a parent apparatus owns the newest version of the game application. FIG. 4 is a communication timing chart showing an example of the process in a case where the information processing apparatus 3*b* set as a child apparatus owns the newest version of the game application.

First, with reference to FIG. 3, a description is given of the example of the process in a case where the information processing apparatus 3*a* set as a parent apparatus owns the newest version of the game application. In FIG. 3, before the communication game is started, the three information processing apparatuses 3*a* to 3*c* to perform the communication game perform a parent/child setting process for setting the information processing apparatuses 3*a* to 3*c* themselves as a parent apparatus or child apparatuses. For example, among the information processing apparatuses 3*a* to 3*c*, the information processing apparatus 3*a*, which has first gathered members to participate in the communication game, using the local communication, is set as a parent apparatus, and the other participating apparatuses (the information processing apparatuses 3*b* and 3*c*) are set as child apparatuses. More specifically, when the communication game is started, options for selecting whether to create a group or participate in a group are displayed. When "create group" is selected by user selection, this information processing apparatus 3 is set as a parent apparatus. When "participate in group" is selected, this information processing apparatus 3 is set as a child apparatus. In the parent/child setting process, the information processing apparatus 3*a* as the parent apparatus receives user names (apparatus IDs) from the child apparatuses to participate in the communication game, thereby managing the information processing apparatuses 3 to participate in the communication game. Then, the information processing apparatus 3*a* as the parent apparatus transmits parent/child setting data including the user names (the apparatus IDs) managed as the parent apparatus and the child apparatuses to the information processing apparatuses 3*b* and 3*c* as the child apparatuses, whereby the information processing apparatuses 3*a* to 3*c* share user information (the apparatus IDs) set in the parent apparatus and the child apparatuses.

Next, the information processing apparatus 3*a* as the parent apparatus determines whether or not to perform the process of making the versions of the game application the same among the apparatuses to participate in the communication game. As an example, when the first user operating the information processing apparatus 3*a* as the parent apparatus performs an operation for performing the process of making the versions of the game application the same among the apparatuses, the above determination of the information processing apparatus 3*a* as the parent apparatus is affirmative. As another example, when a predetermined initialization stage for starting the communication game arrives, the above determination of the information processing apparatus 3*a* as the parent apparatus is automatically affirmative.

When the process of making the versions of the game application the same among the apparatuses is started, the information processing apparatus 3*a* as the parent apparatus performs the process of specifying the versions of the game application (a version specifying process). For example, the information processing apparatus 3*a* as the parent apparatus receives version information indicating the version of the game application owned by the information processing apparatus 3*b* as one of the child apparatuses from the information processing apparatus 3*b* through the local communication. Further, the information processing apparatus 3*a* as the parent apparatus receives version information indicating the version of the game application owned by the information processing apparatus 3*c* as one of the child apparatuses from the information processing apparatus 3*c* through the local communication. Then, using version information indicating the version of the game application owned by the information processing apparatus 3*a* itself and the received version information of the child apparatuses, the information processing apparatus 3*a* as the parent apparatus specifies an information processing apparatus that owns the newest version of the game application among these versions. In this example, the information processing apparatus 3*a* as the parent apparatus owns the newest version of the game application. Thus, the information processing apparatus 3*a* itself is specified as an information processing apparatus that owns the newest version. It should be noted that the newest version means the most recent version of the game application among the versions owned by the information processing apparatuses 3 to participate in the communication game, and is not necessarily the latest version distributed to the world.

When the information processing apparatus 3a as the parent apparatus owns the newest version of the game application, and the information processing apparatuses 3b and 3c as the child apparatuses own older versions of the game application than the newest version, the information processing apparatus 3a as the parent apparatus transmits through the local communication the game update program for updating the game application to the newest version to each of the information processing apparatuses 3b and 3c as the child apparatuses. It should be noted that when there is already a child apparatus that owns the same newest version of the game application as that of the parent apparatus, the game update program does not need to be transmitted to the child apparatus.

Receiving the game update program from the information processing apparatus 3a as the parent apparatus, the information processing apparatus 3b as one of the child apparatuses updates the game application owned by the information processing apparatus 3b itself to the newest version, using the received game update program. Then, after the update process is completed, the information processing apparatus 3b as one of the child apparatuses transmits, to the information processing apparatus 3a as the parent apparatus through the local communication, update information indicating that the game application owned by the information processing apparatus 3b itself is updated to the newest version. Further, receiving the game update program from the information processing apparatus 3a as the parent apparatus, the information processing apparatus 3c as one of the child apparatuses updates the game application owned by the information processing apparatus 3c itself to the newest version, using the received game update program. Then, after the update process is completed, the information processing apparatus 3c as one of the child apparatuses transmits, to the information processing apparatus 3a as the parent apparatus through the local communication, update information indicating that the game application owned by the information processing apparatus 3c itself is updated to the newest version.

It should be noted that in a case where there are three or more update steps for the game application, the game update program to be transmitted may be used to update the most initial version to the newest version, or may be used to update the versions owned by the respective apparatuses to the newest version. In the first case, in each apparatus having received the game update program, the game update program for updating the most initial version to the version owned by the apparatus itself may be removed from the received game update program, and the game application may be updated from the version owned by the apparatus itself to the newest version, using the game update program after the removal. In this case, the same game update program is transmitted to the apparatuses even when the versions owned by the respective apparatuses are different from each other.

Next, the information processing apparatus 3a as the parent apparatus performs a version specifying process for determining whether or not the versions of the game application owned by the respective apparatuses become the same as each other. For example, based on the update information received from the information processing apparatus 3b as one of the child apparatuses, the update information received from the information processing apparatus 3c as one of the child apparatuses, and the version information of the information processing apparatus 3a itself, the information processing apparatus 3a as the parent apparatus determines whether or not the versions of the game application owned by the respective apparatuses become the same as each other. Then, when the versions of the game application owned by the respective apparatuses become the same as each other, it is determined that the communication game becomes able to be performed among the information processing apparatuses 3a to 3c. Then, the communication game is started among the information processing apparatuses 3a to 3c. Then, game data is transmitted and received among the information processing apparatuses 3a to 3c through the local communication, whereby communication game processing based on the newest version of the game application progresses.

With reference to FIG. 4, a description is given of the example of the process in a case where the information processing apparatus 3b set as a child apparatus owns the newest version of the game application. In FIG. 4, before the communication game is started, the three information processing apparatuses 3a to 3c to perform the communication game perform a parent/child setting process for setting the information processing apparatuses 3a to 3c themselves as a parent apparatus or child apparatuses. Then, the information processing apparatus 3a as a parent apparatus determines whether or not to perform the process of making the versions of the game application the same among the apparatuses to participate in the communication game. It should be noted that the parent/child setting process and the process of determining whether or not to perform the process of making the versions of the game application the same among the apparatuses are similar to the example described with reference to FIG. 3, and therefore are not described in detail here. Also in this example, in the parent/child setting process, the information processing apparatus 3a is set as a parent apparatus, and the information processing apparatuses 3b and 3c are set as child apparatuses.

When the process of making the versions of the game application the same among the apparatuses is started, the information processing apparatus 3a as the parent apparatus performs the process of specifying the versions of the game application (a version specifying process). For example, the information processing apparatus 3a as the parent apparatus receives version information indicating the version of the game application owned by the information processing apparatus 3b as one of the child apparatuses from the information processing apparatus 3b through the local communication. Further, the information processing apparatus 3a as the parent apparatus receives version information indicating the version of the game application owned by the information processing apparatus 3c as one of the child apparatuses from the information processing apparatus 3c through the local communication. Then, using version information indicating the version of the game application owned by the information processing apparatus 3a itself and the received version information of the child apparatuses, the information processing apparatus 3a as the parent apparatus specifies an information processing apparatus that owns the newest version of the game application among these versions. In this example, the information processing apparatus 3b as one of the child apparatuses owns the newest version of the game application. Thus, the information processing apparatus 3b is specified as an information processing apparatus that owns the newest version.

When the information processing apparatus 3*b* as one of the child apparatuses owns the newest version of the game application, and the information processing apparatus 3*a* as the parent apparatus and the information processing apparatus 3*c* as one of the child apparatuses own older versions of the game application than the newest version, the information processing apparatus 3*a* as the parent apparatus transmits through the local communication a request for the game update program for updating the game application to the newest version to the information processing apparatus 3*b* that owns the newest version of the game application. It should be noted that when a plurality of information processing apparatuses 3 as child apparatuses own the newest version of the game application, the information processing apparatus 3 as the parent apparatus transmits a request for the game update program to the child apparatus having participated earliest in an apparatus group in which the information processing apparatus 3 itself serves as the parent apparatus.

Receiving the request for the game update program from the information processing apparatus 3*a* as the parent apparatus, the information processing apparatus 3*b* as one of the child apparatuses transmits the game update program for updating the game application to the newest version to the information processing apparatus 3*a* as the parent apparatus through the local communication.

Receiving the game update program from the information processing apparatus 3*b* as one of the child apparatuses, the information processing apparatus 3*a* as the parent apparatus updates the game application owned by the information processing apparatus 3*a* itself to the newest version, using the received game update program and updates the version information of the information processing apparatus 3*a* itself so as to indicate the newest version. Then, the information processing apparatus 3*a* as the parent apparatus transmits the game update program for updating the game application to the newest version to the information processing apparatus 3*c* as one of the child apparatuses through the local communication.

Receiving the game update program from the information processing apparatus 3*a* as the parent apparatus, the information processing apparatus 3*c* as one of the child apparatuses updates the game application owned by the information processing apparatus 3*c* itself to the newest version, using the received game update program. Then, after the update process is completed, the information processing apparatus 3*c* as one of the child apparatuses transmits, to the information processing apparatus 3*a* as the parent apparatus through the local communication, update information indicating that the game application owned by the information processing apparatus 3*c* itself is updated to the newest version.

Next, the information processing apparatus 3*a* as the parent apparatus performs a version specifying process for determining whether or not the versions of the game application owned by the respective apparatuses become the same as each other. For example, based on the version information received from the information processing apparatus 3*b* as one of the child apparatuses, the update information received from the information processing apparatus 3*c* as one of the child apparatuses, and the version information of the information processing apparatus 3*a* itself after the update, the information processing apparatus 3*a* as the parent apparatus determines whether or not the versions of the game application owned by the respective apparatuses become the same as each other. Then, when the versions of the game application owned by the respective apparatuses become the same as each other, it is determined that the communication game becomes able to be performed among the information processing apparatuses 3*a* to 3*c*. Then, the communication game is started among the information processing apparatuses 3*a* to 3*c*. Then, game data is transmitted and received among the information processing apparatuses 3*a* to 3*c* through the local communication, whereby communication game processing based on the newest version of the game application progresses.

It should be noted that in the above example of the process, the information processing apparatus 3*b* as one of the child apparatuses that owns the game update program for updating the game application to the newest version transmits the game update program to the information processing apparatus 3*c* as one of the child apparatuses via the information processing apparatus 3*a* as the parent apparatus. Thus, in the example shown in FIG. 4, the information processing apparatus 3*a* as the parent apparatus transfers the game update program owned by the information processing apparatus 3*b* as one of the child apparatuses to the information processing apparatus 3*c* as another one of the child apparatuses. It should be noted that the game update program owned by the information processing apparatus 3*b* as one of the child apparatuses may be transmitted from the information processing apparatus 3*b* as one of the child apparatuses to the information processing apparatus 3*c* as another one of the child apparatuses. In this case, the game update program is directly transmitted from the information processing apparatus 3*b* as one of the child apparatuses to each of the information processing apparatus 3*a* as the parent apparatus and the information processing apparatus 3*c* as one of the child apparatuses through the local communication.

Further, in the above example of the process, when a child apparatus owns the game update program for updating the game application to the newest version, the game update program is transmitted from the child apparatus to a parent apparatus. However, when a child apparatus owns the newest version of the game update program, the settings of parent and child apparatuses may be changed. For example, in the example shown in FIG. 4, when it is specified that the information processing apparatus 3*b* as one of the child apparatuses owns the newest version of the game update program, then after a parent/child resetting process for setting as a parent apparatus the information processing apparatus 3*b* that owns the newest version of the game update program and also resetting the other information processing apparatuses 3*a* and 3*c* as child apparatuses is performed, the process of transmitting and receiving the game update program may be performed.

It should be noted that in the above example, an example has been used where the version information is transmitted and received using the local communication. Alternatively, the version information may be requested using a beacon. For example, when the information processing apparatus 3*a* as the parent apparatus performs a version specifying process, the information processing apparatus 3*a* transmits a beacon including the version information of the game application owned by the parent apparatus, i.e., broadcasts the version information. Then, when receiving the beacon, each of the information processing apparatuses 3*b* and 3*c* as the child apparatuses transmits data including the version information of the game application of the child apparatus to the information processing apparatus 3*a* as the parent apparatus, i.e., unicasts the version information to the parent apparatus. Next, when either of the pieces of version information received from the information processing apparatuses 3*b* and 3c as the child apparatuses is newer than the version information of the parent apparatus, the information processing apparatus 3a as the parent apparatus changes the version information included in the beacon to be transmitted from the parent apparatus to the new version information received from the child apparatus and continues transmitting the beacon including the changed version information. That is, the information processing apparatus 3a as the parent apparatus appropriately updates the version information included in the beacon, where necessary, and the information processing apparatuses 3b and 3c as the child apparatuses cannot necessarily receive the version information of the parent apparatus. In this case, the information processing apparatus 3a as the parent apparatus transmits the newest version information in the group, using the beacon. Further, each of the information processing apparatus 3a as the parent apparatus and the information processing apparatuses 3b and 3c as the child apparatuses may display the newest version information in the group on a screen using the version information included in the beacon, thereby notifying its user in advance of which version the game application is to be updated to as a result of making the versions the same as each other.

Further, in the exemplary embodiment, in each information processing apparatus 3, a main body application (system software) is executed separately from the game application, thereby controlling the entirety of the operation of the apparatus. The main body application is a program for controlling at least the execution of the game application and other applications by the information processing apparatus 3 and functions as a basic application for controlling the operation of the information processing apparatus 3. For example, the processing by the basic application may include the processes of steps S100-S108, steps S111-S119, steps S131-S136, and steps S141-S147, which will be described later, i.e., the processes illustrated in FIGS. 8 and 9 except for a game start process in step S120 and game processing in steps S121 and S148. Here, when executing the newest version of the game application, the information processing apparatus 3 may also need to update the basic application for controlling the execution of the game application to a version corresponding to the newest version. For example, information indicating the version of the basic application necessary to execute a predetermined version of the game application is stored in the game application, the game update program, and the like. With reference to the information indicating the version of the basic application, the information processing apparatus 3 determines whether or not, when the versions are made the same as the newest version of the game application, the basic application also needs to be updated to a version corresponding to the newest version.

In a case where the versions of the basic application for controlling the execution of the game application also need to be the same among the information processing apparatuses 3 to achieve such a communication game using the plurality of information processing apparatuses 3, then before the communication game is started, it is also determined whether or not the above versions of the basic application are the same among the information processing apparatuses 3. Then, when the above versions are different from each other, the plurality of information processing apparatuses 3 transmit and receive a basic update program to and from each other through the local communication to make the above versions the same as the newest version among the versions of the basic application owned by the information processing apparatuses 3. It should be noted that, typically, the data size of the basic update program is configured to be larger than the data size of the game update program.

Figure 5:
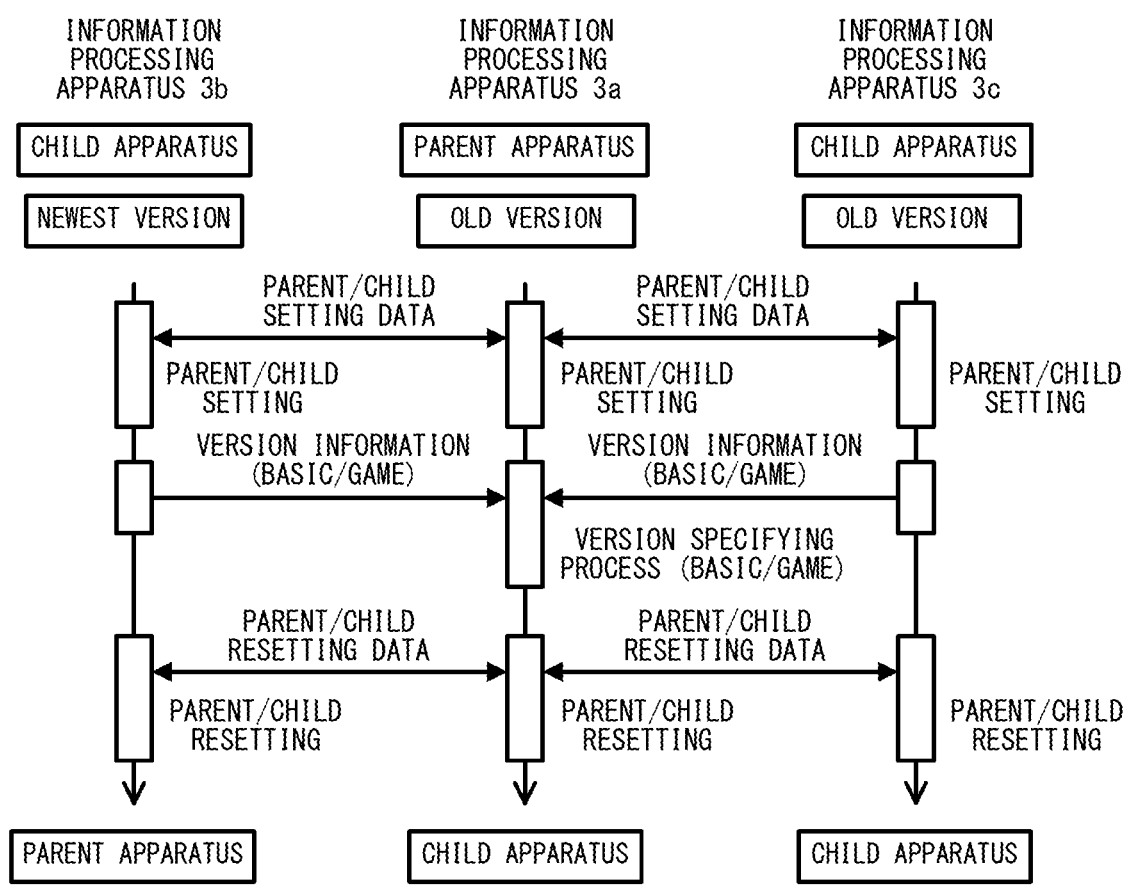
FIG. 5 is a communication timing chart showing a non-limiting example of the first half of a process in a case where the information processing apparatus 3b set as a child apparatus owns the newest version of a basic application and the version of the game application.
Figure 6:
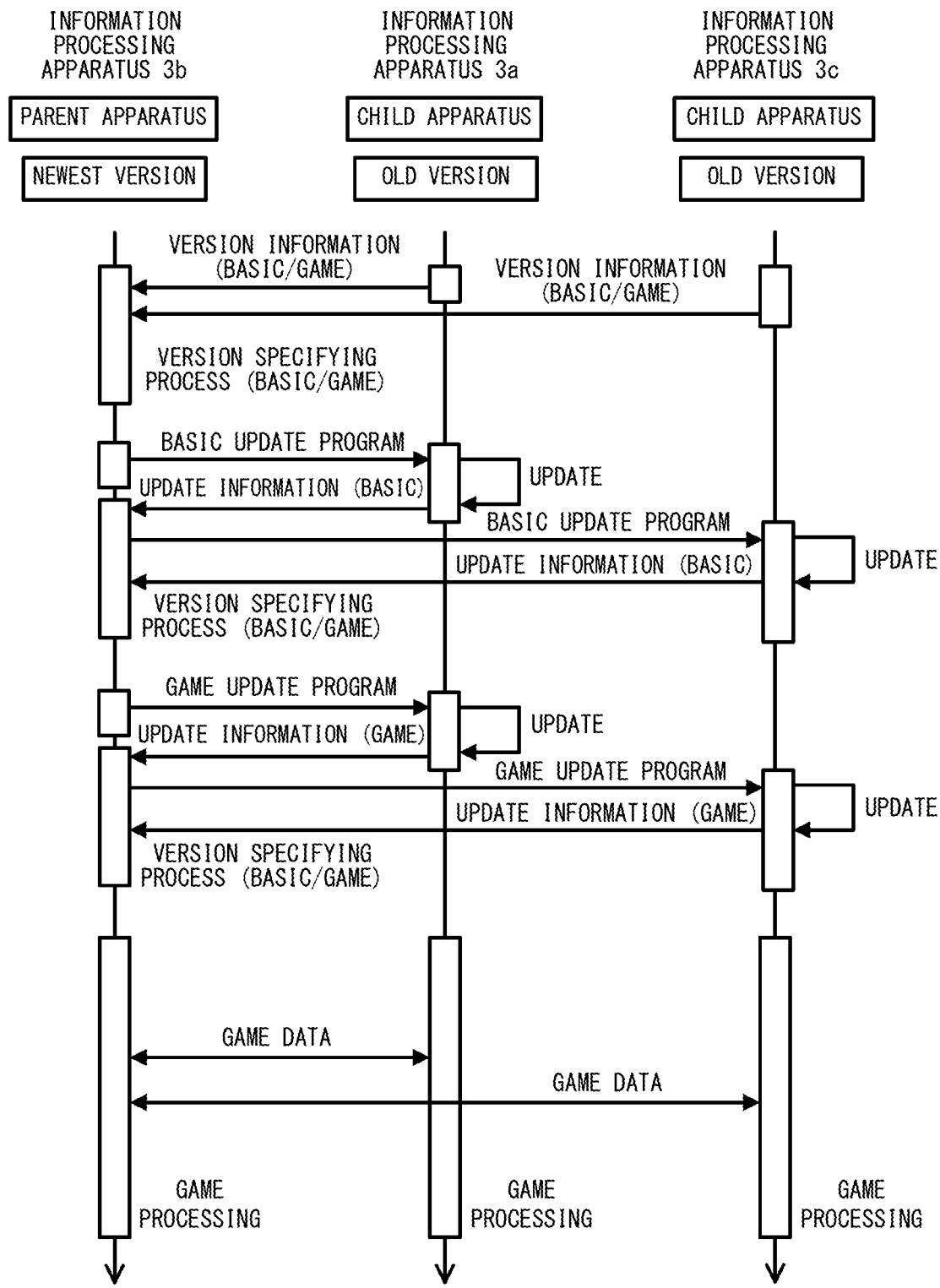
FIG. 6 is a communication timing chart showing a non-limiting example of the second half of the process in a case where the information processing apparatus 3b set as the child apparatus owns the newest version of the basic application and the version of the game application.

With reference to FIGS. 5 and 6, a description is given of examples of the process of specifying the versions of both the basic application and the game application among the plurality of information processing apparatuses 3 and making the specified versions the same as the newest version among the plurality of information processing apparatuses 3. It should be noted that FIG. 5 is a communication timing chart showing an example of the first half of the process in a case where the information processing apparatus 3b set as a child apparatus owns the newest version of the basic application and the version of the game application. FIG. 6 is a communication timing chart showing an example of the second half of the process in a case where the information processing apparatus 3b set as a child apparatus owns the newest version of the basic application and the version of the game application.

In FIG. 5, before the communication game is started, the three information processing apparatuses 3a to 3c to perform the communication game perform a parent/child setting process for setting the information processing apparatuses 3a to 3c themselves as a parent apparatus or child apparatuses. For example, among the information processing apparatuses 3a to 3c, the information processing apparatus 3a, which has first gathered members to participate in the communication game, using the local communication, is set as a parent apparatus, and the other participating apparatuses (the information processing apparatuses 3b and 3c) are set as child apparatuses.

Next, the information processing apparatus 3a as the parent apparatus determines whether or not to perform the process of making the versions of the game application the same among the apparatuses to participate in the communication game. When the process of making the versions of the game application the same among the apparatuses is started, the information processing apparatus 3a as the parent apparatus performs the process of specifying the versions of both the basic application and the game application (a version specifying process). For example, the information processing apparatus 3a as the parent apparatus receives version information obtained by collecting information of the versions of both the basic application and the game application owned by the information processing apparatus 3b as one of the child apparatuses and information indicating the version of the basic application necessary to execute the game application, from the information processing apparatus 3b through the local communication. Further, the information processing apparatus 3a as the parent apparatus receives version information obtained by collecting information of the versions of both the basic application and the game application owned by the information processing apparatus 3c as one of the child apparatuses and information indicating the version of the basic application necessary to execute the game application, from the information processing apparatus 3c through the local communication. Then, using version information indicating the versions of the basic application and the game application owned by the information processing apparatus 3a itself and the received version information of the child apparatuses, the information processing apparatus 3a as the parent apparatus specifies an information processing apparatus that owns the newest versions of the basic application and the game application. Then, based on the information indicating the version of the basic application necessary to execute the game application, the information processing apparatus 3a determines whether or not it is necessary to update the basic application. In this example, the above determination is affirmative, and the child information processing apparatus 3b as one of the child apparatuses owns the newest versions of the basic application and the game application. Thus, the information processing apparatus 3b as one of the child apparatuses is specified as an information processing apparatus that owns the newest versions. It should be noted that the newest versions mean the most recent versions of the basic application and the game application among the versions owned by the information processing apparatuses 3 to participate in the communication game, and are not necessarily the latest versions distributed to the world.

When it is specified that a child apparatus other than the information processing apparatus 3a itself owns the newest versions of the basic application and the game application, the information processing apparatus 3a as the parent apparatus performs a parent/child resetting process. Specifically, by the parent/child resetting process, the child apparatus that owns the newest versions of the basic application and the game application (i.e., the information processing apparatus 3b) is changed to a parent apparatus, and the other information processing apparatuses 3 are set as child apparatuses. It should be noted that the information processing apparatuses 3a to 3c already share the user information (the apparatus IDs). Thus, parent/child setting data indicating that the information processing apparatus 3b is changed to a parent apparatus is transmitted from the information processing apparatus 3a to each of the information processing apparatuses 3b and 3c, whereby the parent/child resetting process for changing the information processing apparatus 3b to a parent apparatus and setting the other information processing apparatuses 3 as child apparatuses is performed in each of the information processing apparatuses 3a to 3c. The processing after the information processing apparatus 3b is reset as a parent apparatus will be described with reference to FIG. 6.

In FIG. 6, the information processing apparatus 3b changed to the parent apparatus performs the process of specifying the versions of both the basic application and the game application (a version specifying process). For example, the information processing apparatus 3b as the parent apparatus receives version information obtained by collecting information of the versions of both the basic application and the game application owned by the information processing apparatus 3a as one of the child apparatuses, from the information processing apparatus 3a through the local communication. Further, the information processing apparatus 3b as the parent apparatus receives version information obtained by collecting information of the versions of both the basic application and the game application owned by the information processing apparatus 3c as one of the child apparatuses, from the information processing apparatus 3c through the local communication. Then, using version information indicating the versions of the basic application and the game application owned by the information processing apparatus 3b itself and the received version information of the child apparatuses, the information processing apparatus 3b as the parent apparatus specifies an information processing apparatus that owns the newest versions of the basic application and the game application among these versions. In this example, the information processing apparatus 3b changed to the parent apparatus owns the newest versions of the basic application and the game application. Thus, the information processing apparatus 3b itself is specified as an information processing apparatus that owns the newest version.

When the information processing apparatus 3b as the parent apparatus owns the newest versions of the basic application and the game application, and the information processing apparatuses 3a and 3c as the child apparatuses own older versions of the basic application and the game application than the newest versions, the information processing apparatus 3b as the parent apparatus transmits through the local communication the basic update program for updating the basic application to the newest version to each of the information processing apparatuses 3a and 3c as the child apparatuses. It should be noted that the basic update program to be transmitted from the information processing apparatus 3b as the parent apparatus may be only a part of the basic update program necessary to execute the newest version of the game application to enable the communication game. Further, when the newest version of the game application can be executed without even updating the basic application to the newest version, the information processing apparatus 3b as the parent apparatus may not transmit the basic update program for updating the basic application to the newest version to the child apparatuses. In this case, the information processing apparatus 3b as the parent apparatus starts transmitting the game update program for updating the game application to the newest version, as described later.

Receiving the basic update program from the information processing apparatus 3b as the parent apparatus, the information processing apparatus 3a as one of the child apparatuses updates the basic application owned by the information processing apparatus 3a itself to the newest version, using the received basic update program. Then, to apply the above update, the information processing apparatus 3a temporarily disconnects the connection with the parent apparatus and then is restarted. Then, after the update process is completed, the information processing apparatus 3a as one of the child apparatuses resumes the connection with the information processing apparatus 3b as the parent apparatus and transmits, to the information processing apparatus 3b as the parent apparatus through the local communication, update information indicating that the basic application owned by the information processing apparatus 3a itself is updated to the newest version. Further, receiving the basic update program from the information processing apparatus 3b as the parent apparatus, the information processing apparatus 3c as one of the child apparatuses updates the basic application owned by the information processing apparatus 3c itself to the newest version, using the received basic update program. Then, to apply the above update, the information processing apparatus 3c temporarily disconnects the connection with the parent apparatus and then is restarted. Then, after the update process is completed, the information processing apparatus 3c as one of the child apparatuses resumes the connection with the information processing apparatus 3b as the parent apparatus and transmits, to the information processing apparatus 3b as the parent apparatus through the local communication, update information indicating that the basic application owned by the information processing apparatus 3c itself is updated to the newest version.

It should be noted that also in a case where there are three or more update steps for the basic application, the basic update program to be transmitted may be used to update the most initial version to the newest version, or may be used to update the versions owned by the respective apparatuses to the newest version. In the first case, in each apparatus having received the basic update program, the basic update program for updating the most initial version to the version owned by the apparatus itself may be removed from the received basic update program, and the basic application may be updated from the version owned by the apparatus itself to the newest version, using the basic update program after the removal. In this case, the same basic update program is transmitted to the apparatuses even when the versions owned by the respective apparatuses are different from each other.

Next, the information processing apparatus 3b as the parent apparatus performs a version specifying process for determining whether or not the versions of the basic application owned by the respective apparatuses become the same as each other. For example, based on the update information received from the information processing apparatus 3a as one of the child apparatuses, the update information received from the information processing apparatus 3c as one of the child apparatuses, and the version information of the information processing apparatus 3b itself, the information processing apparatus 3b as the parent apparatus determines whether or not the versions of the basic application owned by the respective apparatuses become the same as each other. Then, when the versions of the basic application owned by the respective apparatuses become the same as each other, the information processing apparatus 3b as the parent apparatus transmits through the local communication the game update program for updating the game application to the newest version to the child apparatuses in which the update of basic application is completed. It should be noted that before the versions of the basic application of the child apparatuses become the same as each other, and in accordance with the fact that update information indicating that the basic application is updated to the newest version is received, the information processing apparatus 3b as the parent apparatus may transmit through the local communication the game update program for updating the game application to the newest version to the child apparatuses, starting from a child apparatus in which the update of the basic application is completed.

Receiving the game update program from the information processing apparatus 3b as the parent apparatus, the information processing apparatus 3a as one of the child apparatuses updates the game application owned by the information processing apparatus 3a itself to the newest version, using the received game update program. Then, after the update process is completed, the information processing apparatus 3a as one of the child apparatuses transmits, to the information processing apparatus 3b as the parent apparatus through the local communication, update information indicating that the game application owned by the information processing apparatus 3a itself is updated to the newest version. Further, receiving the game update program from the information processing apparatus 3b as the parent apparatus, the information processing apparatus 3c as one of the child apparatuses updates the game application owned by the information processing apparatus 3c itself to the newest version, using the received game update program. Then, after the update process is completed, the information processing apparatus 3c as one of the child apparatuses transmits, to the information processing apparatus 3b as the parent apparatus through the local communication, update information indicating that the game application owned by the information processing apparatus 3c itself is updated to the newest version.

Next, the information processing apparatus 3b as the parent apparatus performs a version specifying process for determining whether or not the versions of the game application owned by the respective apparatuses become the same as each other. For example, based on the update information received from the information processing apparatus 3a as one of the child apparatuses, the update information received from the information processing apparatus 3c as one of the child apparatuses, and the version information of the information processing apparatus 3b itself, the information processing apparatus 3b as the parent apparatus determines whether or not the versions of the game application owned by the respective apparatuses become the same as each other. Then, when the versions of the game application owned by the respective apparatuses become the same as each other, it is determined that the communication game becomes able to be performed among the information processing apparatuses 3a to 3c. Then, the communication game is started among the information processing apparatuses 3a to 3c. Then, game data is transmitted and received among the information processing apparatuses 3a to 3c through the local communication, whereby communication game processing based on the newest version of the game application progresses.

It should be noted that in the above descriptions, an example has been used where an information processing apparatus 3 that owns the newest version of the basic application serves as a parent apparatus. Consequently, it is possible to prevent a processing error due to the fact that the basic application owned by a parent apparatus is old (e.g., an appropriate process cannot be performed in processing not directly related to the game application, such as the transmission and reception of information to and from a child apparatus, or the management of a group in which an information processing apparatus 3 itself serves as a parent apparatus). If such effects are not desired, similarly to a case where the game application is updated to the newest version, the process of updating the basic application may be performed in the state where an information processing apparatus 3 that owns the newest version of the basic application is set as a child apparatus.

Next, a description is given of the details of the processing performed by each information processing apparatus 3. First, with reference to FIG. 7, main data used in the processing performed by the information processing apparatus 3 is described. It should be noted that FIG. 7 is a diagram showing examples of main data and programs stored in the memory 35 of the information processing apparatus 3.

Figure 7:
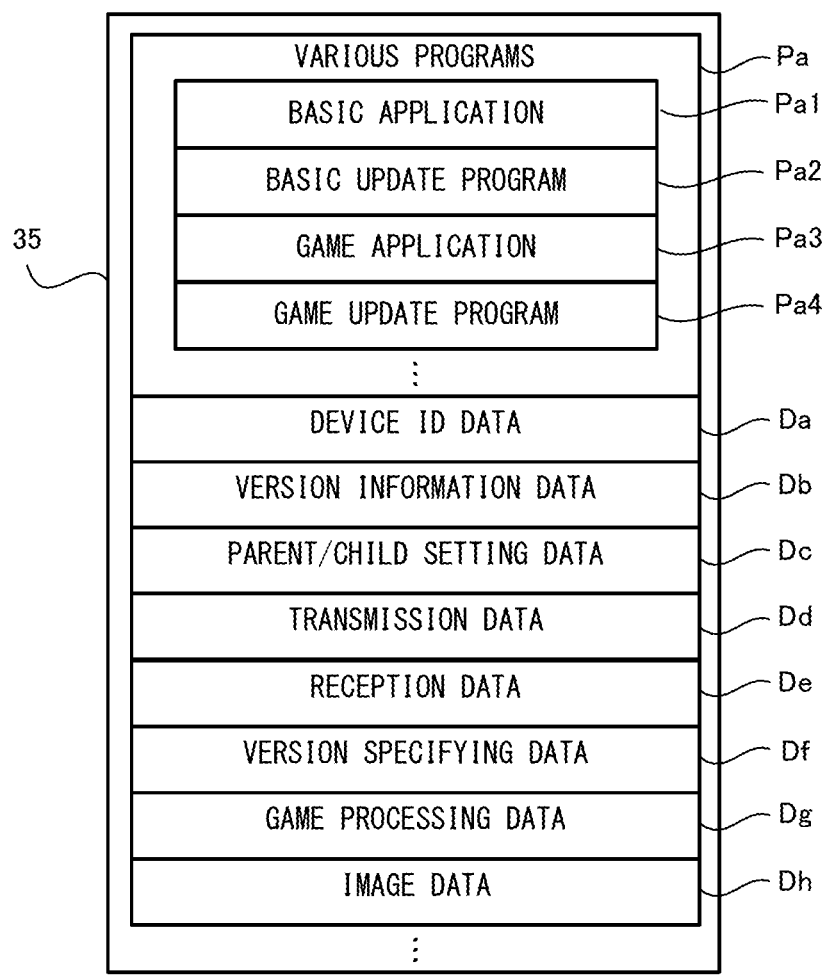
FIG. 7 is a diagram showing non-limiting examples of main data and programs stored in a memory 35 of the information processing apparatus 3.

As shown in FIG. 7 the following are stored in the data storage area of the memory 35: device ID data Da; version information data Db; parent/child setting data Dc; transmission data Dd; reception data De; version specifying data Df; game processing data Dg; image data Dh; and the like. It should be noted that the memory 35 may store, as well as the data included in the information shown in FIG. 7, data necessary for the processing, such as data related to a user operation and data used in an application to be executed. Further, in the program storage area of the memory 35, various programs Pa included in a communication program and a game program are stored. For example, the various programs Pa include a basic application Pa1, a basic update program Pa2, a game application Pa3, a game update program Pa4, and the like.

The device ID data Dc is data representing a unique code (a device ID) that enables the identification of each information processing apparatus 3, and is data representing, for example, an unalterable character string serving as an indicator for the identification of the device. The device ID data Dc stores the device ID set in advance for the information processing apparatus 3 having the memory 35.

The version information data Db includes data representing information indicating the version of the basic application Pa1 owned by the information processing apparatus 3 having the memory 35, and data representing information indicating the version of the game application Pa3 owned by the information processing apparatus 3 having the memory 35.

The parent/child setting data Dc includes data representing which of a parent apparatus and a child apparatus the information processing apparatus 3 having the memory 35 is set as in an apparatus group in which the information processing apparatus 3 having the memory 35 currently participates, and data representing information of other apparatuses in the apparatus group (setting information of a parent apparatus or a child apparatus, device ID information, and the like).

The transmission data Dd is data registered as data to be transmitted to the other information processing apparatuses 3 using the local communication. The reception data De is data received from the other information processing apparatuses 3 using the local communication.

The version specifying data Df is data representing, in the apparatus group in which the information processing apparatus 3 having the memory 35 currently participates, the version of an application owned by each apparatus belonging to the group.

The game processing data Dg is data to be used to perform the communication game using the plurality of information processing apparatuses 3. The image data Dh is data for displaying an image on a display screen before the start of the communication game or during the communication game.

Further, the basic application Pa1 is a program (system software) for controlling the operation of the information processing apparatus 3. The basic update program Pa2 is a program for updating the most initial version of the basic application Pa1 to the version owned by the information processing apparatus 3 having the memory 35. The game application Pa3 is a program for performing the communication game. The game update program Pa4 is a program for updating the most initial version of the game application Pa3 to the version owned by the information processing apparatus 3 having the memory 35.

It should be noted that when the information processing apparatus 3 owns the most initial versions of the basic application and/or the game application, the information processing apparatus 3 may not own the basic update program and/or the game update program. In this case, the update programs may not be stored in the basic update program Pa2 and/or the game update program Pa4.

Figure 8:
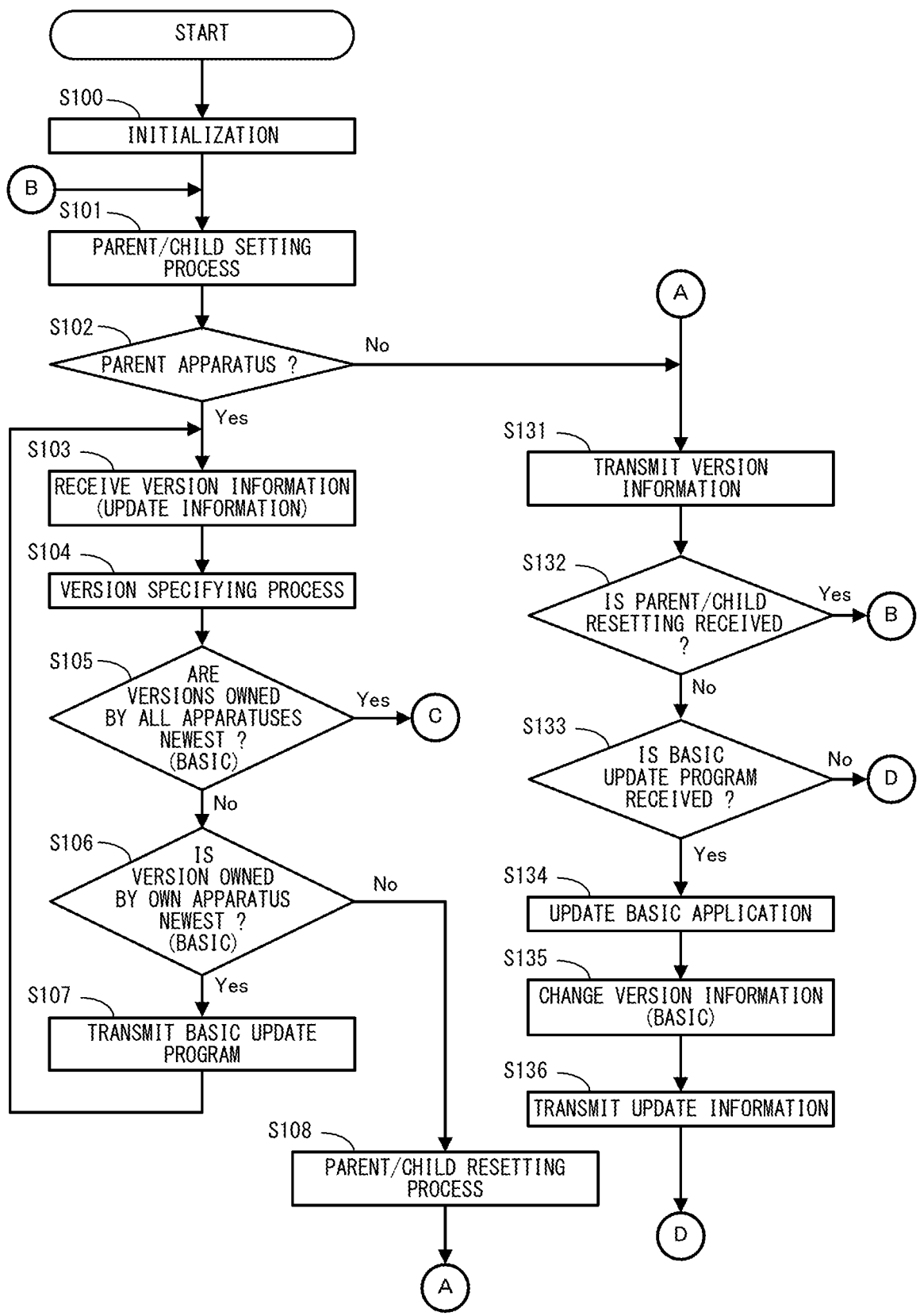
FIG. 8 is a flow chart showing a non-limiting example of the first half of the processing executed by the information processing apparatus 3.
Figure 9:
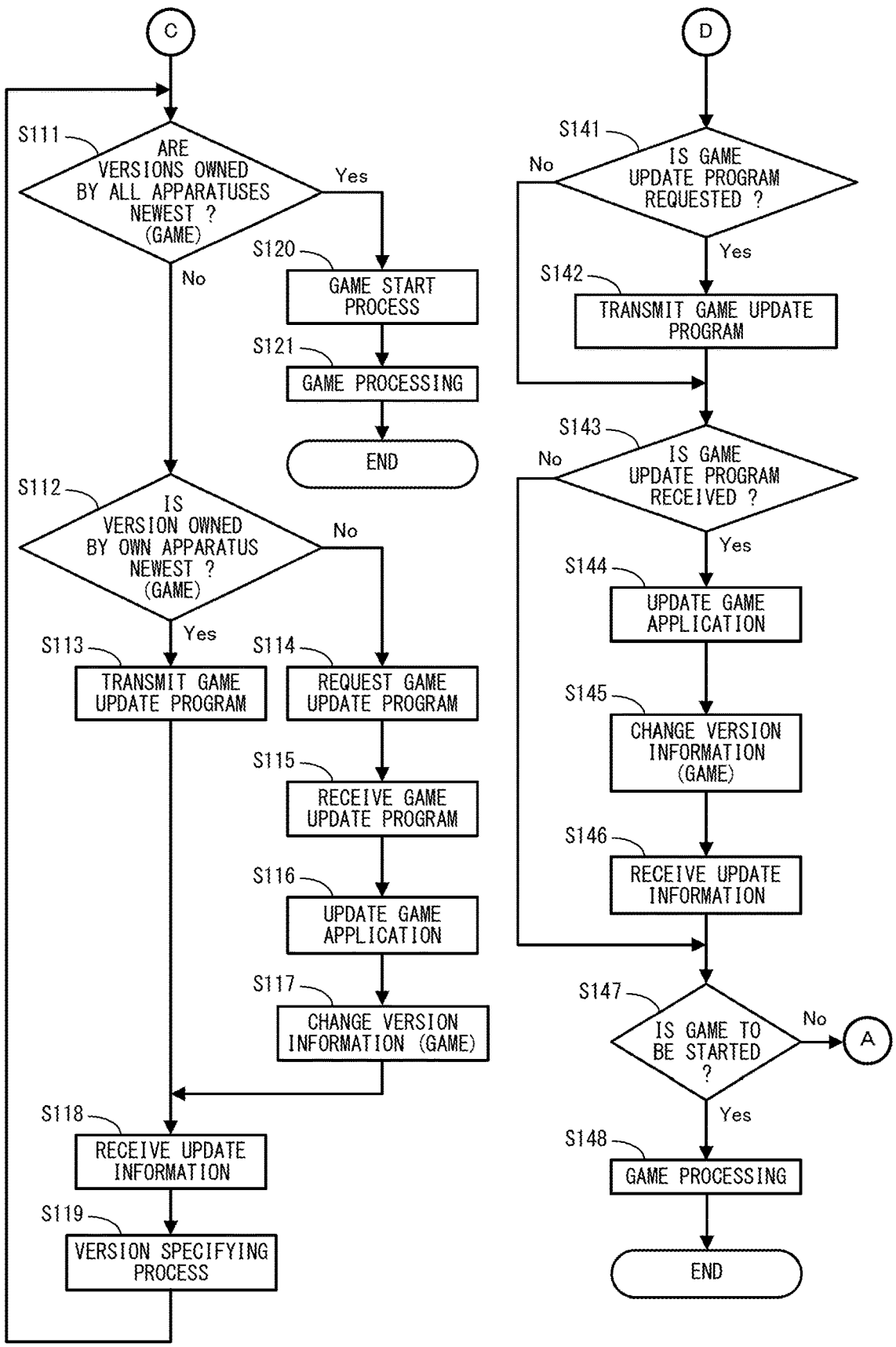
FIG. 9 is a flow chart showing a non-limiting example of the second half of the processing executed by the information processing apparatus 3.

Next, with reference to FIGS. 8 and 9, a description is given of the details of the processing performed by each information processing apparatus 3. It should be noted that FIG. 8 is a flow chart showing an example of the first half of the processing executed by the information processing apparatus 3. FIG. 9 is a flow chart showing an example of the second half of the processing executed by the information processing apparatus 3. Here, in the flow charts shown in FIGS. 8 and 9, a description is given mainly of, in the processing performed by the information processing system 1, a process regarding communication performed between the information processing apparatuses 3 in a state where the information processing apparatuses 3 can communicate with each other. The detailed descriptions of other processes not directly related to these processes are omitted. Further, in FIGS. 8 and 9, all of the steps performed by the CPU 34 are abbreviated as "S".

In the exemplary embodiment, a series of processes shown in FIGS. 8 and 9 is performed by the CPU 34 executing the communication program and the game program stored in the program storage section 36. It should be noted that the processing shown in FIGS. 8 and 9 may be started at any timing. At this time, a part or all of the communication program is loaded into the memory 35 at an appropriately timing and executed by the CPU 34. Consequently, the series of processes shown in FIGS. 8 and 9 is started. It should be noted that the communication program and the game program are stored in advance in the program storage section 36. Alternatively, in another exemplary embodiment, the communication program may be acquired from a storage medium attachable to and detachable from the information processing apparatus 3 and stored in the memory 35, or may be acquired from another apparatus via a network such as the Internet and stored in the memory 35.

It should be noted that the processes of all the steps in the flow charts shown in FIGS. 8 and 9 are merely illustrative. Thus, the processing order of the steps may be changed, or another process may be performed in addition to, and/or instead of, the processes of all the steps, so long as similar results are obtained. Further, in the exemplary embodiment, descriptions are given on the assumption that the CPU 34 performs the processes of all the steps in the flow charts. Alternatively, a processor or a dedicated circuit other than the CPU 34 may perform the processes of some or all of the steps in the flow charts.

In FIG. 8, the CPU 34 performs initialization (step S100), and the processing proceeds to the next step. For example, the CPU 34 initializes parameters for use in the following processing. Further, the CPU 34 initializes the device ID data Da using the device ID of the information processing apparatus 3 having the CPU 34 and initializes the version information data Db using information indicating the versions of the basic application and the game application owned by the information processing apparatus 3 having the CPU 34.

Next, the CPU 34 performs a parent/child setting process (step S101), and the processing proceeds to the next step. For example, in a case where a plurality of information processing apparatuses 3 capable of communicating with each other using local communication are invited to participate in a predetermined communication game, and when the information processing apparatus 3 first gathers members to participate in the communication game, the information processing apparatus 3 is set as a parent apparatus. When the information processing apparatus 3 participates in the communication game in accordance with this gathering, the information processing apparatus 3 is set as one of child apparatuses. It should be noted that in the parent/child setting process, parent/child setting data is exchanged among the information processing apparatuses 3 through the local communication, whereby the information processing apparatuses 3 share the user names (the device IDs) of the information processing apparatus 3 set as a parent apparatus and the user names (the device IDs) of the information processing apparatuses 3 set as child apparatuses. Then, the CPU 34 updates the parent/child setting data Dc using information of the device IDs in which the parent apparatus and the child apparatuses are distinguished.

Next, with reference to the parent/child setting data Dc, the CPU 34 determines whether or not the information processing apparatus 3 having the CPU 34 is set as a parent apparatus (step S102). Then, when the information processing apparatus 3 having the CPU 34 is set as a parent apparatus, the processing proceeds to step S103. On the other hand, when the information processing apparatus 3 having the CPU 34 is set as one of the child apparatuses, the processing proceeds to step S131.

In step S103, the CPU 34 of the information processing apparatus 3 set as the parent apparatus receives version information or update information from the other information processing apparatuses 3 set as the child apparatuses, and the processing proceeds to the next step. Here, the version information is information indicating the versions of the basic application and the game application owned by the information processing apparatuses 3 as the transmission sources and includes information indicating the version of the basic application necessary to execute the game application. Further, the update information is information indicating that the basic application owned by the information processing apparatuses 3 as the transmission sources is updated to the newest version. For example, the CPU 34 updates the version information data Db using the received version information or update information, thereby managing the version information of each apparatus.

Next, the CPU 34 performs a version specifying process (step S104), and the processing proceeds to the next step. For example, using the version information or update information received in the above step S103 and version information of the information processing apparatus 3 having the CPU 34, the CPU 34 specifies the versions of the basic application and the game application owned by each of the information processing apparatuses 3 to participate in the communication game, and based on information indicating the version of the basic application necessary to execute the game application, determines whether or not it is necessary to update the basic application. Then, the CPU 34 specifies an information processing apparatus 3 that owns the newest versions of the basic application and the game application among the information processing apparatuses 3 to participate in the communication game. Here, "the newest versions" mean the most recent versions of the basic application and the game application among the versions owned by the information processing apparatuses 3 to participate in the communication game, and are not necessarily the latest versions distributed to the world.

Next, the CPU 34 determines whether or not the versions of the basic application owned by all the information processing apparatuses 3 to participate in the communication game become the same as the newest version (whether or not it is necessary to update the basic application) (step S105). Then, when the versions of the basic application owned by all the information processing apparatuses 3 to participate in the communication game become the same as the newest version (it is not necessary to update the basic application), the processing proceeds to step S111 (see FIG. 9). On the other hand, when the versions of the basic application owned by all the information processing apparatuses 3 to participate in the communication game do not become the same as the newest version (it is necessary to update the basic application), the processing proceeds to step S106.

In step S106, the CPU 34 determines whether or not the version of the basic application owned by the information processing apparatus 3 having the CPU 34 is the newest version among all the information processing apparatuses 3 to participate in the communication game. Then, when the information processing apparatus 3 having the CPU 34 owns the newest version of the basic application, the processing proceeds to step S107. On the other hand, when another one of the information processing apparatuses 3 as one of the child apparatuses owns the newest version of the basic application, the processing proceeds to step S108.

In step S107, the CPU 34 transmits the basic update program to another one of the information processing apparatuses 3 (one of the child apparatuses) that does not own the newest version of the basic application, and the processing proceeds to step S103. Here, the basic update program to be transmitted to the other one of the information processing apparatuses 3 is a program for enabling the update of the basic application to the newest version of the basic application owned by the information processing apparatus 3 having the CPU 34.

On the other hand, when it is determined in step S106 that another one of the information processing apparatuses 3 as one of the child apparatuses owns the newest version of the basic application, the CPU 34 performs a parent/child resetting process (step S108), and the processing proceeds to step S131. For example, in the parent/child resetting process, the CPU 34 changes the other one of the information processing apparatuses 3 as one of the child apparatuses that owns the newest version of the basic application (when a plurality of child apparatuses own the newest version of the basic application, a child apparatus having participated in this group relatively early) to a parent apparatus, and the CPU 34 changes the information processing apparatus 3 having the CPU 34 to a child apparatus, thereby updating the parent/child setting data Dc. Then, the CPU 34 transmits parent/child resetting data indicating the changes in a parent apparatus and a child apparatus to the other information processing apparatuses 3 through the local communication. Consequently, the information processing apparatus 3 that has been set as a parent apparatus is changed from the parent apparatus to a child apparatus. Then, when the processing proceeds to step S131, the CPU 34 performs processing as a child apparatus.

When it is determined in the above step S102 that the information processing apparatus 3 having the CPU 34 is set as one of the child apparatuses, the CPU 34 of the information processing apparatus 3 set as one of the child apparatuses transmits version information to another one of the information processing apparatuses 3 set as a parent apparatus (step S131), and the processing proceeds to the next step. For example, using version information stored in the version information data Db of the information processing apparatus 3 having the CPU 34, the CPU 34 transmits the version information to the information processing apparatus 3 as the parent apparatus through the local communication.

Next, the CPU 34 determines whether or not parent/child resetting data is received from the information processing apparatus 3 as the parent apparatus (step S132). Then, when the CPU 34 receives parent/child resetting data from the information processing apparatus 3 as the parent apparatus, the processing proceeds to step S101. Then, the CPU 34 executes the parent/child setting process again. On the other hand, when the CPU 34 does not receive parent/child resetting data from the information processing apparatus 3 as the parent apparatus, the processing proceeds to step S133.

In step S133, the CPU 34 determines whether or not the basic update program is received from the information processing apparatus 3 as the parent apparatus. Then, when the CPU 34 receives the basic update program from the information processing apparatus 3 as the parent apparatus, the processing proceeds to step S134. On the other hand, when the CPU 34 does not receive the basic update program from the information processing apparatus 3 as the parent apparatus, the processing proceeds to step S141 (see FIG. 9).

In step S134, the CPU 34 updates the basic application owned by the information processing apparatus 3 having the CPU 34, using the basic update program transmitted from the information processing apparatus 3 as the parent apparatus, and the processing proceeds to the next step. For example, the CPU 34 updates the basic application Pa1 and the basic update program Pa2 owned by the information processing apparatus 3 having the CPU 34, using the basic update program transmitted from the information processing apparatus 3 as the parent apparatus. Then, to apply the above update, the CPU 34 temporarily disconnects the connection with the parent apparatus and then is restarted. Then, after the update process is completed, the CPU 34 resumes the connection with the parent apparatus.

Next, the CPU 34 updates the version information data Db of the information processing apparatus 3 having the CPU 34 using the version of the basic application updated in the above step S134 (step S135), and the processing proceeds to the next step.

Next, the CPU 34 transmits update information to the information processing apparatus 3 as the parent apparatus through the local communication (step S136), and the processing proceeds to step S141 (see FIG. 9). Here, the update information to be transmitted in the above step S141 includes information indicating that the basic application owned by the information processing apparatus 3 having the CPU 34 as the transmission source is updated to the newest version.

In FIG. 9, in step S111, the CPU 34 of the information processing apparatus 3 set as the parent apparatus determines whether or not the versions of the game application owned by all the information processing apparatuses 3 to participate in the communication game become the same as the newest version. Then, when the versions of the game application owned by all the information processing apparatuses 3 to participate in the communication game become the same as the newest version, the processing proceeds to step S120. On the other hand, when the versions of the game application owned by all the information processing apparatuses 3 to participate in the communication game do not become the same as the newest version, the processing proceeds to step S112.

In step S112, the CPU 34 determines whether or not the version of the game application owned by the information processing apparatus 3 having the CPU 34 is the newest version among all the information processing apparatuses 3 to participate in the communication game. Then, when the information processing apparatus 3 having the CPU 34 owns the newest version of the game application, the processing proceeds to step S113. On the other hand, when another one of the information processing apparatuses 3 as one of the child apparatuses owns the newest version of the game application, the processing proceeds to step S114.

In step S113, the CPU 34 transmits the game update program to another one of the information processing apparatuses 3 (one of the child apparatuses) that does not own the newest version of the game program, and the processing proceeds to step S118. Here, the game update program to be transmitted to the other one of the information processing apparatuses 3 is a program for enabling the update of the game application to the newest version of the game application owned by the information processing apparatus 3 having the CPU 34 and is transmitted using the game update program Pa4 of the information processing apparatus 3 having the CPU 34.

On the other hand, when it is determined in step S112 that another one of the information processing apparatuses 3 as one of the child apparatuses owns the newest version of the game application, the CPU 34 requests the game update program from the child apparatus (step S114), and the processing proceeds to the next step. For example, the CPU 34 transmits through the local communication a game update program request for requesting the child apparatus that owns the newest version of the game application (when a plurality of child apparatuses own the newest version of the game application, a child apparatus having participated in this group relatively early) to transmit the game update program.

Next, the CPU 34 receives the game update program from the child apparatus that owns the newest version of the game application (step S115), and the processing proceeds to the next step.

Next, the CPU 34 updates the game application owned by the information processing apparatus 3 having the CPU 34, using the game update program transmitted from the other one of the information processing apparatuses 3 set as one of the child apparatuses (step S116), and the processing proceeds to the next step. For example, the CPU 34 updates the game application Pa3 and the game update program Pa4 owned by the information processing apparatus 3 having the CPU 34, using the game update program transmitted from the other one of the information processing apparatuses 3.

Next, the CPU 34 updates the version information data Db of the information processing apparatus 3 having the CPU 34 using the version of the game application updated in the above step S116 (step S117), and the processing proceeds to step S118.

In step S118, the CPU 34 receives update information from the other one of the information processing apparatuses 3 set as one of the child apparatuses, and the processing proceeds to the next step. For example, the CPU 34 updates the version information data Db using the received update information and manages the version information of each apparatus.

Next, the CPU 34 performs a version specifying process (step S119), and the processing proceeds to step S111. For example, using the update information received in the above step S118, the already received version information, and the version information of the information processing apparatus 3 having the CPU 34, the CPU 34 specifies the version of the game application owned by each of the information processing apparatuses 3 to participate in the communication game. Then, the CPU 34 specifies an information processing apparatus 3 that owns the newest version of the game application among the information processing apparatuses 3 to participate in the communication game.

On the other hand, when it is determined in the above step S111 that the versions of the game application owned by all the information processing apparatuses 3 to participate in the communication game become the same as the newest version, the CPU 34 performs a game start process (step S120), and the processing proceeds to the next step. For example, the CPU 34 transmits, through the local communication to the other information processing apparatuses 3 (the child apparatuses) to participate in the communication game, data indicating that the communication game is to be started.

Next, the CPU 34 exchanges game data with the other information processing apparatuses 3 (the child apparatuses), thereby advancing the communication game (step S121). Then, the processing in the flow charts ends.

In step S141, the CPU 34 of the information processing apparatus 3 set as one of the child apparatuses determines whether or not a game update program request is received from the information processing apparatus 3 set as the parent apparatus. Then, when the CPU 34 receives a game update program request, the processing proceeds to step S142. On the other hand, when the CPU 34 does not receive a game update program request, the processing proceeds to step S143.

In step S142, in accordance with the game update program request, the CPU 34 transmits the game update program to the information processing apparatus 3 set as the parent apparatus, and the processing proceeds to step S143. Here, the game update program to be transmitted to the information processing apparatus 3 as the parent apparatus is a program for enabling the update of the game application to the newest version of the game application owned by the information processing apparatus 3 having the CPU 34 and is transmitted using the game update program Pa4 of the information processing apparatus 3 having the CPU 34.

In step S143, the CPU 34 determines whether or not the game update program is received from the information processing apparatus 3 set as the parent apparatus. Then, when the CPU 34 receives the game update program, the processing proceeds to step S144. On the other hand, when the CPU 34 does not receive the game update program, the processing proceeds to step S147.

In step S144, the CPU 34 updates the game application owned by the information processing apparatus 3 having the CPU 34, using the game update program transmitted from the information processing apparatus 3 set as the parent apparatus, and the processing proceeds to the next step. For example, the CPU 34 updates the game application Pa3 and the game update program Pa4 owned by the information processing apparatus 3 having the CPU 34, using the game update program transmitted from the information processing apparatus 3 as the parent apparatus.

Next, the CPU 34 updates the version information data Db of the information processing apparatus 3 having the CPU 34 using the version of the game application updated in the above step S144 (step S145), and the processing proceeds to the next step.

Next, the CPU 34 transmits update information to the information processing apparatus 3 set as the parent apparatus through the local communication (step S146), and the processing proceeds to step S147. Here, the update information to be transmitted in the above step S146 is information indicating that the game application owned by the information processing apparatus 3 having the CPU 34 as the transmission source is updated to the newest version.

In step S147, the CPU 34 determines whether or not data indicating that the communication game is to be started is received from the information processing apparatus 3 set as the parent apparatus. Then, when the CPU 34 receives data indicating the start of the game, the processing proceeds to step S148. On the other hand, when the CPU 34 does not receive data indicating the start of the game, the processing returns to the above step S131, and the process of step S131 is repeated.

In step S148, the CPU 34 exchanges game data with another one of the information processing apparatuses 3 (the parent apparatus), thereby advancing the communication game. Then, the processing in the flow charts ends.

As described above, according to the information processing system 1 for performing the communication game, even in a situation where an application cannot be updated using communication on the Internet (e.g., in a case where the information processing system 1 is not in the environment where the information processing system 1 can connect to a server), the application can be executed by making the versions of the application the same among a plurality of information processing apparatuses, using local communication.

It should be noted that in the above descriptions, when the basic application or the game application is updated, the update program or pieces of data are transmitted and received via an information processing apparatus 3 set as a parent apparatus. Consequently, the parent apparatus can concentrate on the management of local communication among information processing apparatuses 3. This facilitates the control of the local communication. However, when it is not necessary to cause a parent apparatus to concentrate on the management of communication, information processing apparatuses 3 set as child apparatuses may perform locally communicate with each other not via the parent apparatus. For example, when only an information processing apparatus 3 set as a first child apparatus owns the newest version of the game application, and an information processing apparatus 3 set as a parent apparatus and an information processing apparatus 3 set as a second child apparatus own older versions of the game application than the newest version, the first child apparatus may transmit the game update program to the parent apparatus, and the first child apparatus may also transmit the game update program to the second child apparatus not via the parent apparatus.

Further, as described above, each information processing apparatus 3 may be a mobile game apparatus, and is composed of a device such as a general personal computer, a stationary game apparatus, a mobile phone, or a PDA (Personal Digital Assistant). Alternatively, a different type of device may be included in an apparatus group for performing the communication game. As an example, apparatus groups including stationary game apparatuses and mobile game apparatuses may locally communicate with each other, thereby performing the communication game.

Further, the above descriptions have been given using an example where the information processing apparatus 3 performs information processing and a communication process. Alternatively, another apparatus may perform at least some of the processing steps in the processing. For example, when the information processing apparatus 3 is further configured to communicate with another apparatus (e.g., another server, another game apparatus, or another mobile terminal), the other apparatus may cooperate to perform the processing steps in the processing. Another apparatus may thus perform at least some of the processing steps in the processing, thereby enabling processing similar to the above processing. Further, the above processing can be performed by a processor or the cooperation of a plurality of processors, the processor or the plurality of processors included in an information processing system including at least one information processing apparatus. Further, in the above exemplary embodiment, the processing in the above flow charts is performed by the CPU 34 of the information processing apparatus 3 executing a predetermined program. Alternatively, a part or all of the processing in the flow charts may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

Further, the processing orders, the setting values, the conditions used in the determinations, and the like that are used in the above information processing are merely illustrative. Thus, it goes without saying that the exemplary embodiment can be achieved also with other orders, other values, and other conditions.

Further, the above programs may be supplied to the information processing apparatus 3 not only through an external storage medium such as an external memory, but also through a wired or wireless communication link. Further, the above programs may be stored in advance in a non-volatile storage device included in the information processing apparatus 3. It should be noted that examples of an information storage medium having stored therein the above programs may include CD-ROMs, DVDs, optical disk storage media similar to these, flexible disks, hard disks, magneto-optical disks, and magnetic tapes, as well as non-volatile memories. Alternatively, an information storage medium having stored therein the above programs may be a volatile memory for storing the above programs. It can be said that such a storage medium is a storage medium readable by a computer or the like. For example, it is possible to provide the above various functions by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing system, an information processing apparatus, an information processing program, an information processing method, and the like in order, for example, to, even in a situation where an application cannot be updated using communication on the Internet, enable the execution of the application by making the versions of the application the same among a plurality of information processing apparatuses.

What is claimed is:

1. An information processing system including a first information processing apparatuses and a plurality of second information processing apparatuses, the first information processing apparatus storing a user application update program and a basic application update program, the first and second information processing apparatuses in the information processing system being connected to one another in a local network via direct wireless communication and being configured to connect via Internet communication to a server to receive updates, each information processing apparatus comprising a computer, the computer of the first processing apparatus being configured to at least:

receive from the second information processing apparatuses first version information indicating a version of a user application stored to the respective second information processing apparatuses;

receive from each of the second information processing apparatuses second version information indicating a version of a basic application stored to the respective second information processing apparatuses, the basic application being programmed to at least control execution of the user application;

based on the received second version information, determine whether each second information processing apparatus lacks a most recent version of the basic application;

directly transmit, wirelessly through the local network, the basic application update program from the first information processing apparatus to each second information processing apparatus determined to lack the most recent version of the basic application, the direct transmission of the basic application update program causing each information processing apparatus that directly receives it to update the basic application thereon;

based on the received first version information, determine whether each second information processing apparatus lacks a most recent version of the user application; and directly transmit, wirelessly through the local network, the user application update program from the first information processing apparatus to each second information processing apparatus determined to lack the most recent version of the user application, the direct transmission of the user application update program causing each information processing apparatus that directly receives it to update the user application thereon;

wherein the first information processing apparatus is the information processing apparatus in the local network that has stored thereon the most recent version of the user application, and wherein the user application update program is transmittable from the first information processing apparatus to each second information processing apparatus, and usable to update the user application on the respective second information processing apparatus, once the most recent version of the basic application is stored on the respective second information processing apparatus.

2. The information processing system according to claim 1, wherein each of the information processing apparatuses is controllable to operate in first and second modes, the first mode causing the respective information processing apparatus to act as the first information processing apparatus while all other information processing apparatuses in the information processing system operate as second information processing apparatuses, the second mode causing the respective information processing apparatus to act as one of the second information processing apparatuses while another information processing apparatus in the information processing system acts as the first information processing apparatus.

3. The information processing system according to claim 2, wherein one of the information processing apparatuses in the information processing system is designated as a parent apparatus configured to determine which of the information processing apparatuses in the information processing system is to operate in the first mode, and wherein the information processing apparatuses in the information processing system that are not designated as the parent apparatus are designated as child apparatuses.

4. The information processing system according to claim 3, wherein the parent apparatus is configured to set itself to operate in the first mode based on it having the most recent version of the user application.

5. The information processing system according to claim 3, wherein the parent apparatus is configured to set one of the child apparatuses to operate in the first mode based on that child apparatus having the most recent version of the user application.

6. The information processing system according to claim 3, wherein when the parent apparatus lacks the most recent version of the user application, the parent apparatus is configured to obtain the most recent version of the user application from the child apparatus that has it stored thereon, and thereafter, to set itself to operate in the first mode.

7. The information processing system according to claim 1, wherein each of the computers of the plurality of information processing apparatuses is configured to execute the user application to transmit data to and receive data from the other information processing apparatuses, and based on the transmitted and received data, perform information processing.

8. The information processing system according to claim 3, wherein when the information processing apparatus that stores the newest version of the basic application is the child apparatus, the child apparatus is changed to a parent apparatus, and another one of the information processing apparatuses is changed to a child apparatus.

9. The information processing system according to claim 1, wherein the server is not one of the plurality of information processing apparatuses and is outside of the local network.

10. The information processing system according to claim 9, wherein the direct transmission and direct reception are performable, even though an Internet connection to the server is unavailable.

11. The information processing system according to claim 1, wherein direct transmission between information processing apparatuses is performable in the absence of an Internet connection.

12. The information processing system according to claim 1, wherein the computer of a given information processing apparatus in the local network is further configured to:
  obtain and execute the basic application update program, conditioned on the given information processing apparatus lacking the most recent version of the basic application, and
  once the information processing apparatuses in the local network include the most recent version of the basic application:
    obtain and execute the user application update program, conditioned on the given information processing apparatus lacking the most recent version of the user application,
    designate the given information processing apparatus as the first information processing apparatus, conditioned on the given apparatus having or being updated to have the most recent version of the user application, and
    perform the direct transmission of the user application update program following the designation.

13. The information processing system according to claim 1, wherein the computer of a given information processing apparatus is further configured to:
  transmit the basic application update program, conditioned on the given information processing apparatus either having the most recent version of the basic application or having received the basic application update program from another information processing apparatus, and
  once the information processing apparatuses in the local network include the most recent version of the basic application:
    perform the direct transmission of the user application update program, conditioned on the given information processing apparatus either having the most recent version of the user application or having received the user application update program from another information processing apparatus.

14. An information processing method executed by a processor or cooperation of a plurality of processors, the processor or the plurality of processors included in an information processing system including a first information processing apparatus and a plurality of second information processing apparatuses, the first information processing apparatus storing a user application update program and a basic application update program, the first and second information processing apparatuses in the information processing system being connected to one another in a local network via direct wireless communication and being configured to connect via Internet communication to a server to receive updates, the information processing method comprising the first processing apparatus:
  receiving from the second information processing apparatuses first version information indicating a version of a user application stored to the respective second information processing apparatuses;
  receiving from each of the second information processing apparatuses second version information indicating a version of a basic application stored to the respective second information processing apparatuses, the basic application being programmed to at least control execution of the user application;
  based on the received second version information, determining whether each second information processing apparatus lacks a most recent version of the basic application;
  directly transmitting, wirelessly through the local network, the basic application update program from the first information processing apparatus to each second information processing apparatus determined to lack the most recent version of the basic application, the direct transmission of the basic application update program causing each information processing apparatus that directly receives it to update the basic application thereon;
  based on the received first version information, determining whether each second information processing apparatus lacks a most recent version of the user application; and directly transmitting, wirelessly through the local network, the user application update program from the first information processing apparatus to each second information processing apparatus determined to lack the most recent version of the user application, the direct transmission of the user application update program causing each information processing apparatus that directly receives it to update the user application thereon;

wherein the first information processing apparatus is the information processing apparatus in the local network that has stored thereon the most recent version of the user application, and wherein the user application update program is transmittable from the first information processing apparatus to each second information processing apparatus, and usable to update the user application on the respective second information processing apparatus, once the most recent version of the basic application is stored on the respective second information processing apparatus.

15. The information processing method according to claim 14, wherein a given information processing apparatus in the local network is configured to:

obtain and execute the basic application update program, conditioned on the given information processing apparatus lacking the most recent version of the basic application, and once the information processing apparatuses in the local network include the most recent version of the basic application:

obtain and execute the user application update program, conditioned on the given information processing apparatus lacking the most recent version of the user application, designate the given information processing apparatus as the first information processing apparatus, conditioned on the given apparatus having or being updated to have the most recent version of the user application, and perform the direct transmission of the user application update program following the designation.

16. The information processing method according to claim 14, wherein a given information processing apparatus in the local network is configured to:

transmit the basic application update program, conditioned on the given information processing apparatus either having the most recent version of the basic application or having received the basic application update program from another information processing apparatus, and once the information processing apparatuses in the local network include the most recent version of the basic application:

perform the direct transmission of the user application update program, conditioned on the given information processing apparatus either having the most recent version of the user application or having received the user application update program from another information processing apparatus.

17. The information processing method according to claim 14, wherein each of the information processing apparatuses is controllable to operate in first and second modes, the first mode causing the respective information processing apparatus to act as the first information processing apparatus while all other information processing apparatuses in the information processing system operate as second information processing apparatuses, the second mode causing the respective information processing apparatus to act as one of the second information processing apparatuses while another information processing apparatus in the information processing system acts as the first information processing apparatus.

18. A first information processing apparatus for use with an information processing system including the first information processing apparatus and a plurality of second information processing apparatuses, the first information processing apparatus storing a user application update program and a basic application update program, the first and second information processing apparatuses in the information processing system being connected to one another in a local network via direct wireless communication and being configured to connect via Internet communication to a server to receive updates, a computer of the first information processing apparatus being configured to at least:

receive from the second information processing apparatuses first version information indicating a version of a user application stored to the respective second information processing apparatuses;

receive from each of the second information processing apparatuses second version information indicating a version of a basic application stored to the respective second information processing apparatuses, the basic application being programmed to at least control execution of the user application;

based on the received second version information, determine whether each second information processing apparatus lacks a most recent version of the basic application;

directly transmit, wirelessly through the local network, the basic application update program from the first information processing apparatus to each second information processing apparatus determined to lack the most recent version of the basic application, the direct transmission of the basic application update program causing each information processing apparatus that directly receives it to update the basic application thereon;

based on the received first version information, determine whether each second information processing apparatus lacks a most recent version of the user application; and directly transmit, wirelessly through the local network, the user application update program from the first information processing apparatus to each second information processing apparatus determined to lack the most recent version of the user application, the direct transmission of the user application update program causing each information processing apparatus that directly receives it to update the user application thereon; wherein the first information processing apparatus is the information processing apparatus in the local network that has stored thereon the most recent version of the user application, and wherein the user application update program is transmittable from the first information processing apparatus to each second information processing apparatus, and usable to update the user application on the respective second information processing apparatus, once the most recent version of the basic application is stored on the respective second information processing apparatus.

19. The first information processing apparatus according to claim 18, wherein the direct transmission is performed without using the server.

20. The first information processing apparatus according to claim 18, wherein the direct transmission is performed even though an Internet connection is unavailable.

21. The first information processing apparatus according to claim 18, wherein each of the information processing apparatuses is controllable to operate in first and second modes, the first mode causing the respective information processing apparatus to act as the first information processing apparatus while all other information processing apparatuses in the information processing system operate as second information processing apparatuses, the second mode causing the respective information processing apparatus to act as one of the second information processing apparatuses while another information processing apparatus in the information processing system acts as the first information processing apparatus.

22. A non-transitory computer readable storage medium tangibly storing a program including instructions that, when executed by at least one processor of a first information processing apparatus in an information processing system including the first information processing apparatus and a plurality of second information processing apparatuses, are configured to cause the first information processing apparatus to perform functionality, wherein the first information processing apparatus stores a user application update program and a basic application update program, the first and second information processing apparatuses in the information processing system being connected to one another in a local network via direct wireless communication and being configured to connect via Internet communication to receive updates, the functionality performable by the first information processing apparatus comprising:
- receiving from the second information processing apparatuses first version information indicating a version of a user application stored to the respective second information processing apparatuses;
- receiving from each of the second information processing apparatuses second version information indicating a version of a basic application stored to the respective second information processing apparatuses, the basic application being programmed to at least control execution of the user application;
- based on the received second version information, determining whether each second information processing apparatus lacks a most recent version of the basic application;
- directly transmitting, wirelessly through the local network, the basic application update program from the first information processing apparatus to each second information processing apparatus determined to lack the most recent version of the basic application, the direct transmission of the basic application update program causing each information processing apparatus that directly receives it to update the basic application thereon;
- based on the received first version information, determining whether each second information processing apparatus lacks a most recent version of the user application; and
- directly transmitting, wirelessly through the local network, the user application update program from the first information processing apparatus to each second information processing apparatus determined to lack the most recent version of the user application, the direct transmission of the user application update program causing each information processing apparatus that directly receives it to update the user application thereon;

wherein the first information processing apparatus is the information processing apparatus in the local network that has stored thereon the most recent version of the user application, and wherein the user application update program is transmittable from the first information processing apparatus to each second information processing apparatus, and usable to update the user application on the respective second information processing apparatus, once the most recent version of the basic application is stored on the respective second information processing apparatus.

23. The non-transitory computer readable storage medium according to claim 22, wherein a given information processing apparatus in the local network is configured to:
- obtain and execute the basic application update program, conditioned on the given information processing apparatus lacking the most recent version of the basic application, and
- once the information processing apparatuses in the local network include the most recent version of the basic application:
  - obtain and execute the user application update program, conditioned on the given information processing apparatus lacking the most recent version of the user application,
  - designate the given information processing apparatus as the first information processing apparatus, conditioned on the given apparatus having or being updated to have the most recent version of the user application, and
  - perform the direct transmission of the user application update program following the designation.

24. The non-transitory computer readable storage medium according to claim 22, wherein a given information processing apparatus in the local network is configured to:
- transmit the basic application update program, conditioned on the given information processing apparatus either having the most recent version of the basic application or having received the basic application update program from another information processing apparatus, and
- once the information processing apparatuses in the local network include the most recent version of the basic application:
  - perform the direct transmission of the user application update program, conditioned on the given information processing apparatus either having the most recent version of the user application or having received the user application update program from another information processing apparatus.

25. The non-transitory computer readable storage medium according to claim 22, wherein each of the information processing apparatuses is controllable to operate in first and second modes, the first mode causing the respective information processing apparatus to act as the first information processing apparatus while all other information processing apparatuses in the information processing system operate as second information processing apparatuses, the second mode causing the respective information processing apparatus to act as one of the second information processing apparatuses while another information processing apparatus in the information processing system acts as the first information processing apparatus.

\* \* \* \* \*